US011887080B2

United States Patent
Royyuru et al.

(10) Patent No.: US 11,887,080 B2
(45) Date of Patent: Jan. 30, 2024

(54) INSTANT DIGITAL ISSUANCE

(71) Applicant: First Data Corporation, Brookfield, WI (US)

(72) Inventors: Vijay Royyuru, Norristown, PA (US); Sridher Swaminathan, Omaha, NE (US)

(73) Assignee: FIRST DATA CORPORATION, Brookfield, WI (US)

( * ) Notice: Subject to any disclaimer, the term of this patent is extended or adjusted under 35 U.S.C. 154(b) by 303 days.

(21) Appl. No.: 17/324,541

(22) Filed: May 19, 2021

(65) Prior Publication Data

US 2021/0279699 A1    Sep. 9, 2021

Related U.S. Application Data

(63) Continuation-in-part of application No. 16/443,169, filed on Jun. 17, 2019.

(60) Provisional application No. 62/686,369, filed on Jun. 18, 2018.

(51) Int. Cl.
*G06Q 20/10* (2012.01)
*G06Q 20/02* (2012.01)
*G06Q 20/36* (2012.01)

(52) U.S. Cl.
CPC ......... *G06Q 20/102* (2013.01); *G06Q 20/027* (2013.01); *G06Q 20/363* (2013.01)

(58) Field of Classification Search
CPC ... G06Q 20/102; G06Q 20/027; G06Q 20/363
USPC .......................................................... 705/75
See application file for complete search history.

(56) References Cited

U.S. PATENT DOCUMENTS

| | | |
|---|---|---|
| 5,883,810 A | 3/1999 | Franklin et al. |
| 10,146,803 B2 | 12/2018 | Kilby et al. |
| 10,460,312 B1 | 10/2019 | Kurani et al. |
| 10,467,622 B1 | 11/2019 | Rule et al. |

(Continued)

FOREIGN PATENT DOCUMENTS

| | | |
|---|---|---|
| EP | 3 292 499 A1 | 3/2018 |
| EP | 3 292 499 B1 | 3/2018 |

(Continued)

OTHER PUBLICATIONS

Extended European Search Report dated Jun. 28, 2021, EP Patent Application No. 207828989, 10 pages.

(Continued)

*Primary Examiner* — Courtney P Jones
(74) *Attorney, Agent, or Firm* — FOLEY & LARDNER LLP

(57) ABSTRACT

Described herein are techniques for facilitating push provisioning of a user payment source into a user's digital wallet without the user having a physical card. The techniques allow an issuer to provide a button in an issuer's application for the user to simply push the button to request that the payment source be imported into a pay wallet or a merchant. In this way, the payment source information is "pushed" into the pay wallet. Using push provisioning, the user need not enter any physical card information. The described techniques generate a chain of trust that can be used to ensure that a user, through an issuer and using a gateway, authorizes a token service provider to provision the payment source into the pay wallet or merchant.

17 Claims, 21 Drawing Sheets

(56) References Cited

U.S. PATENT DOCUMENTS

| | | |
|---|---|---|
| 2005/0173520 A1 | 8/2005 | Jaros et al. |
| 2008/0052225 A1 | 2/2008 | Walker et al. |
| 2009/0259560 A1 | 10/2009 | Bachenheimer |
| 2010/0123003 A1 | 5/2010 | Olson et al. |
| 2013/0144776 A1 | 6/2013 | Webster et al. |
| 2013/0151400 A1 | 6/2013 | Makhotin et al. |
| 2014/0316826 A1 | 10/2014 | Nicoara et al. |
| 2014/0344153 A1 | 11/2014 | Raj et al. |
| 2015/0032625 A1 | 1/2015 | Dill et al. |
| 2015/0073996 A1 | 3/2015 | Makhotin et al. |
| 2015/0088756 A1 | 3/2015 | Makhotin et al. |
| 2015/0140982 A1 | 5/2015 | Postrel |
| 2015/0269566 A1 | 9/2015 | Gaddam et al. |
| 2015/0327072 A1 | 11/2015 | Powell et al. |
| 2015/0332262 A1 | 11/2015 | Lingappa |
| 2016/0036790 A1* | 2/2016 | Shastry .............. G06Q 20/3821 713/168 |
| 2016/0071094 A1 | 3/2016 | Krishnaiah et al. |
| 2016/0078434 A1 | 3/2016 | Huxham et al. |
| 2016/0094991 A1 | 3/2016 | Powell et al. |
| 2016/0119296 A1 | 4/2016 | Laxminarayanan et al. |
| 2016/0140545 A1 | 5/2016 | Flurscheim et al. |
| 2016/0173483 A1 | 6/2016 | Wong et al. |
| 2016/0260096 A1 | 9/2016 | Lacoss-Arnold et al. |
| 2016/0267445 A1 | 9/2016 | Nano |
| 2016/0292673 A1 | 10/2016 | Chandrasekaran |
| 2016/0321652 A1 | 11/2016 | Dimmick et al. |
| 2016/0328707 A1 | 11/2016 | Wagner et al. |
| 2016/0364721 A1 | 12/2016 | Deliwala et al. |
| 2017/0032362 A1 | 2/2017 | Lahkar et al. |
| 2017/0200165 A1 | 7/2017 | Laxminarayanan et al. |
| 2018/0253718 A1 | 9/2018 | Khan et al. |
| 2018/0253727 A1 | 9/2018 | Ortiz et al. |
| 2018/0276657 A1* | 9/2018 | Cho .................... G06Q 20/405 |
| 2019/0066096 A1 | 2/2019 | Wouters et al. |
| 2019/0066102 A1 | 2/2019 | Powell et al. |
| 2019/0108514 A1 | 4/2019 | Pendse et al. |
| 2019/0385164 A1 | 12/2019 | Royyuru et al. |
| 2020/0082371 A1 | 3/2020 | Laracey |
| 2020/0118205 A1 | 4/2020 | Bloy et al. |
| 2020/0320516 A1 | 10/2020 | Royyuru et al. |
| 2021/0117965 A1* | 4/2021 | Venot .................... G06Q 20/34 |

FOREIGN PATENT DOCUMENTS

| | | |
|---|---|---|
| KR | 101814133 | 1/2018 |
| KR | 101814134 | 1/2018 |
| WO | WO-2015/107442 A1 | 7/2015 |
| WO | WO-2017/160877 A1 | 9/2017 |

OTHER PUBLICATIONS

Extended European Search Report dated Nov. 12, 2021, EP Application No. EP 19823010.4, 9 pages.

International Search Report and Written Opinion dated Feb. 11, 2022, International Patent Application No. PCT/US2021/033110, 13 pages.

International Search Report and Written Opinion dated Jun. 29, 2020, PCT/US2020/026352, 10 pages.

International Search Report and Written Opinion dated Sep. 10, 2019 in related foreign application No. PCT/US2019/037654, 7 pgs.

Non-Final Office Action on U.S. Appl. No. 17/100,909 dated Feb. 16, 2023.

* cited by examiner

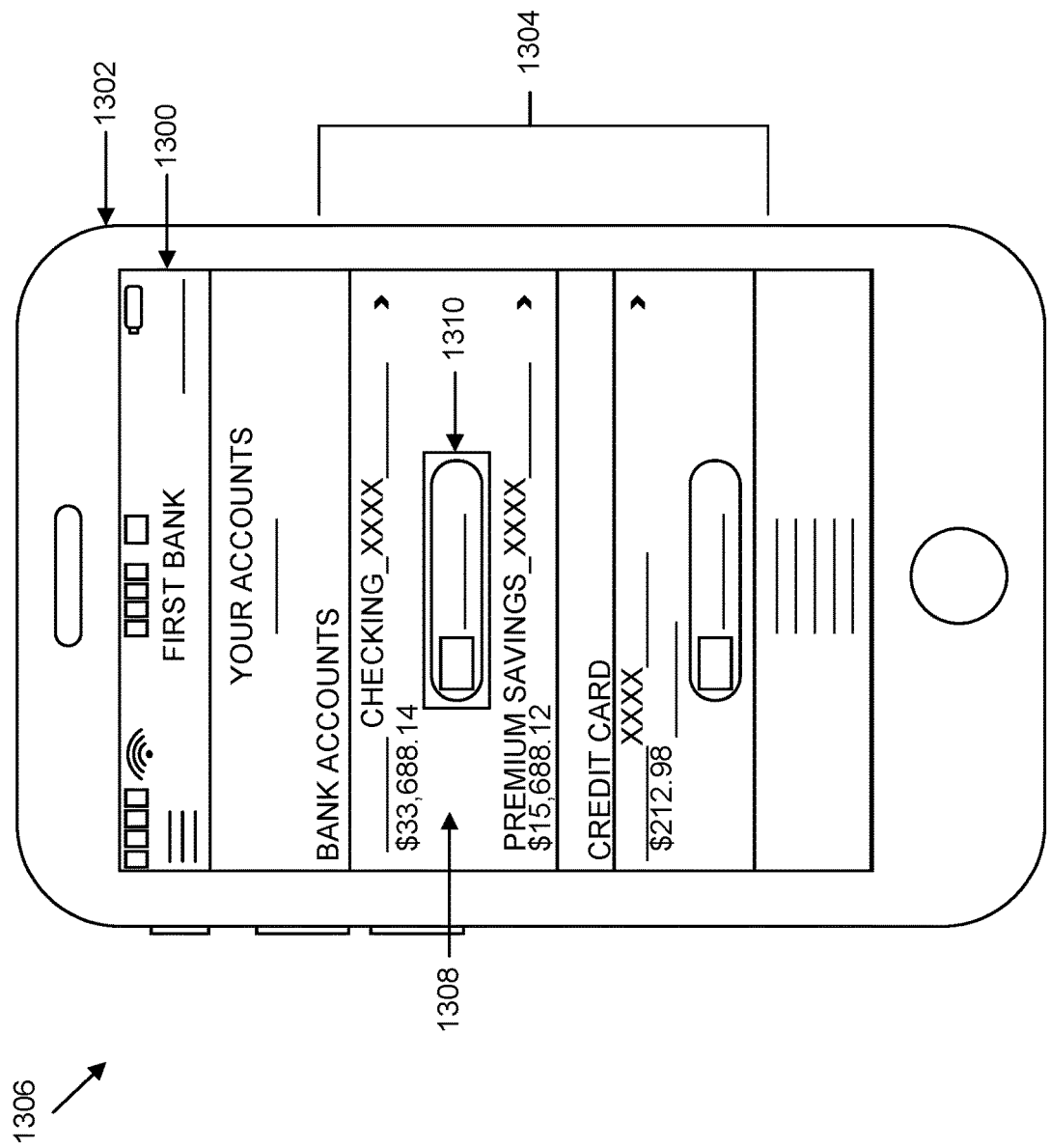

INSTANT DIGITAL ISSUANCE

CROSS-REFERENCES TO RELATED APPLICATIONS

This application is a continuation-in-part of U.S. Non-Provisional application Ser. No. 16/443,169, filed on Jun. 17, 2019, and which in turn claims priority to U.S. Provisional Application No. 62/686,369, filed Jun. 18, 2018, the entireties of which are incorporated by reference herein.

BACKGROUND

Banks and other credit providers often issue cards for fund use to users, making fast payment quick and easy for users through the use of a credit or debit card. In this way, users must have the card physically available at the point of sale. However, to issue a physical card takes time and costs the issuer and/or user money to generate the card due to labor, material, and shipping costs and costs the issuer and/or user time to wait for generation and shipping of the card before the card can be used. With the advent of online sales and secure mobile devices, other strategies are needed and would be beneficial to both users and card issuers to reduce the time and costs associated with the existing physical card payment systems.

SUMMARY

To address the issues associated with provisioning a physical payment source, systems and methods for providing instant digital issuance of a new payment source, such as a credit card, in a mobile or digital wallet of the user, are described herein. The relevant provisioning and encryption necessary to ensure, for the token service provider, the validity of the payment source from the issuer for the user is described herein.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes receiving, at a gateway encryption service of a gateway system, from an issuer mobile application server, user information for a user and account information for a payment source of the user. The gateway encryption service can transmit the user information and the account information to a gateway lookup service of the gateway system. The gateway lookup service can receive, from an issuing host platform, primary account number data for the payment source. The gateway lookup service can transmit the primary account number data to the gateway encryption service. The gateway encryption service can encrypt the primary account number data to generate encrypted provision data. The gateway encryption service can transmit the encrypted provision data to the issuer mobile application server. The issuer mobile application server, having the encrypted provision data, can allow the user to utilize the digital payment source in a digital wallet without the user having the physical payment source. Other embodiments of this aspect include corresponding computer systems, apparatus, and computer programs recorded on one or more computer storage devices, each configured to perform the actions of the methods.

Implementations may include one or more of the following features. Optionally, encrypting the primary account number data includes identifying an encryption key and/or a validation key from multiple encryption and/or validation keys using the primary account number data, and encrypting, using the encryption key, and/or signing, using the validation key, the primary account number data to generate the encrypted provision data. Optionally, the encryption key and/or the validation key identifies a token service provider.

Optionally, encrypting the primary account number data further includes identifying a first set of encryption requirements for the mobile device pay wallet using wallet data from the mobile device pay wallet, and identifying a second set of encryption requirements for the token service provider. In such cases, encrypting the primary account number data using the encryption key includes complying with the first set of encryption requirements and complying with the second set of encryption requirements.

Optionally, the gateway encryption service may receive the encryption key and/or the validation key and store the encryption key and/or the validation key in a database with other encryption and/or validation keys. In such cases, identifying the encryption key and/or the validation key includes identifying an associated issuer using the primary account number data and searching the database for the encryption key and/or the validation key using the associated issuer.

Optionally, the payment source is a credit card. Optionally, the user information for the user and the account information for the payment source of the user includes a name of the user, a digital wallet data of the user, and an issuer nonce. Optionally, the primary account number data includes a sixteen-digit primary account number of the payment source, an address of the user, and a nickname of the payment source.

Optionally, an issuer mobile application using a software development kit receives a list of accounts for the user, where the payment source is selected from the list of accounts. Optionally, the issuer mobile application using a software development kit receives the encrypted provision data. The software development kit can invoke a request to provision the payment source in the mobile device pay wallet of the user using the encrypted provision data. The software development kit can receive a result of the request to provision the payment source in the mobile device pay wallet. Optionally, receiving the result of the request to provision the payment source in the mobile device pay wallet includes receiving a token for providing the payment source in the mobile device pay wallet.

Optionally, the gateway encryption service receives, from the issuer mobile application server, an issuer nonce indicating that the user was authenticated by the issuer mobile application server. Optionally, encrypting the primary account number data includes encrypting the issuer nonce along with the primary account number data. Optionally, The token service provider receives the encrypted primary account number data along with the issuer nonce. The token service provider may decrypt the encrypted primary account number data and the issuer nonce using an encryption key and validates the signature using a validation key. In response to validating the signature, the token service provider may transmit the issuer nonce to the issuer in a provision request. The issuer may authorize the provision request and log the issuer nonce. Implementations of the described techniques may include hardware, a method or process, or computer software on a computer-accessible medium.

In accordance with some embodiments of the present disclosure, a non-transitory computer-readable medium having computer-readable instructions stored thereon is disclosed. The computer-readable instructions that when executed by at least one first processor associated with a gateway and at least one second processor associated with a software development kit for provisioning a payment source cause the at least one first processor and the at least one second processor to receive, by the gateway, a first request from an issuer application on behalf of a cardholder for a list of entities comprising merchants or pay wallets that are eligible to receive the payment source, send, by the gateway, the list of entities to the issuer application for display to the cardholder for selection of an entity from the list of entities; receive, by the gateway, a second request from the issuer application in response to sending the list of entities to the issuer application, such that the second request includes an asset identifier associated with the selected entity and user data associated with the cardholder, prepare and transmit, by the gateway, a response to the issuer application upon receiving the second request, such that depending upon a type of a token service provider or the selected entity, the response includes (a) an encrypted payload obtained by encrypting, by the gateway, at least the entity identifier and the user data; or (b) a receipt identifier; receive, by the software development kit, the response from the issuer application. The computer-readable instructions that when executed by at least one first processor associated with a gateway and at least one second processor associated with a software development kit for provisioning a payment source further cause the at least one first processor and the at least one second processor to redirect, by the software development kit, from the issuer application to an entity application associated with the selected entity, such that the redirection includes sending the encrypted payload or the receipt identifier to the entity application to allow the entity application to send the encrypted payload or the receipt identifier to the token service provider to request a new token for the payment source from the token service provider, receive, by the software development kit, a result from the entity application indicating whether the entity application successfully received the new token from the token service provider, and determine, by the software development kit and based on the result, whether the request for the provisioning of the payment source is successful.

In accordance with some other embodiments of the present disclosure, a system is disclosed. The system includes at least one memory having computer-readable instructions stored thereon and at least one first processor associated with a gateway and at least one second processor associated with a software development kit to provision a payment source, such that the at least one first processor and the at least one second processor executes the computer-readable instructions to receive, by the gateway, a first request from an issuer application on behalf of a cardholder for a list of entities comprising merchants or pay wallets that are eligible to receive the payment source; send, by the gateway, the list of entities to the issuer application for display to the cardholder for selection of an entity from the list of entities, receive, by the gateway, a second request from the issuer application in response to sending the list of entities to the issuer application, such that the second request comprises an asset identifier associated with the selected entity and user data associated with the cardholder; prepare and transmit, by the gateway, a response to the issuer application upon receiving the second request, such that depending upon a type of a token service provider or the selected entity, the response comprises (a) an encrypted payload obtained by encrypting, by the gateway, at least the entity identifier and the user data; or (b) a receipt identifier, receive, by the software development kit, the response from the issuer application, redirect, by the software development kit, from the issuer application to an entity application associated with the selected entity, such that the redirection includes sending the encrypted payload or the receipt identifier to the entity application to allow the entity application to send the encrypted payload or the receipt identifier to the token service provider to request a new token for the payment source from the token service provider, receive, by the software development kit, a result from the entity application indicating whether the entity application successfully received the new token from the token service provider, and determine, by the software development kit and based on the result, whether the request for the provisioning of the payment source is successful.

In accordance with some other embodiments of the present disclosure, a method is disclosed. The method includes receiving, by at least one first processor associated with a gateway and at least one second processor associated with a software development kit for provisioning a payment source and executing computer-readable instructions stored on at least one memory, a first request from an issuer application on behalf of a cardholder for a list of entities including merchants or pay wallets that are eligible for receiving the payment source, sending, by the gateway, the list of entities to the issuer application for display to the cardholder for selection of an entity from the list of entities, receiving, by the gateway, a second request from the issuer application in response to sending the list of entities to the issuer application, such that the second request comprises an asset identifier associated with the selected entity and user data associated with the cardholder, preparing and transmitting, by the gateway, a response to the issuer application upon receiving the second request, such that depending upon a type of a token service provider or the selected entity, the response comprises (a) an encrypted payload obtained by encrypting, by the gateway, at least the entity identifier and the user data; or (b) a receipt identifier, receiving, by the software development kit, the response from the issuer application, redirecting, by the software development kit, from the issuer application to an entity application associated with the selected entity, such that the redirection includes sending the encrypted payload or the receipt identifier to the entity application to allow the entity application to send the encrypted payload or the receipt identifier to the token service provider to request a new token for the payment source from the token service provider, receiving, by the software development kit, a result from the entity application indicating whether the entity application successfully received the new token from the token service provider, and determining, by the software development kit and based on the result, whether the request for the provisioning of the payment source is successful.

BRIEF DESCRIPTION OF THE DRAWINGS

FIGS. 13A-13E illustrate example interfaces of a client device for push provisioning a payment source to Apple Pay® wallet, in accordance with some embodiments of the present disclosure.

DETAILED DESCRIPTION

Figure 1:
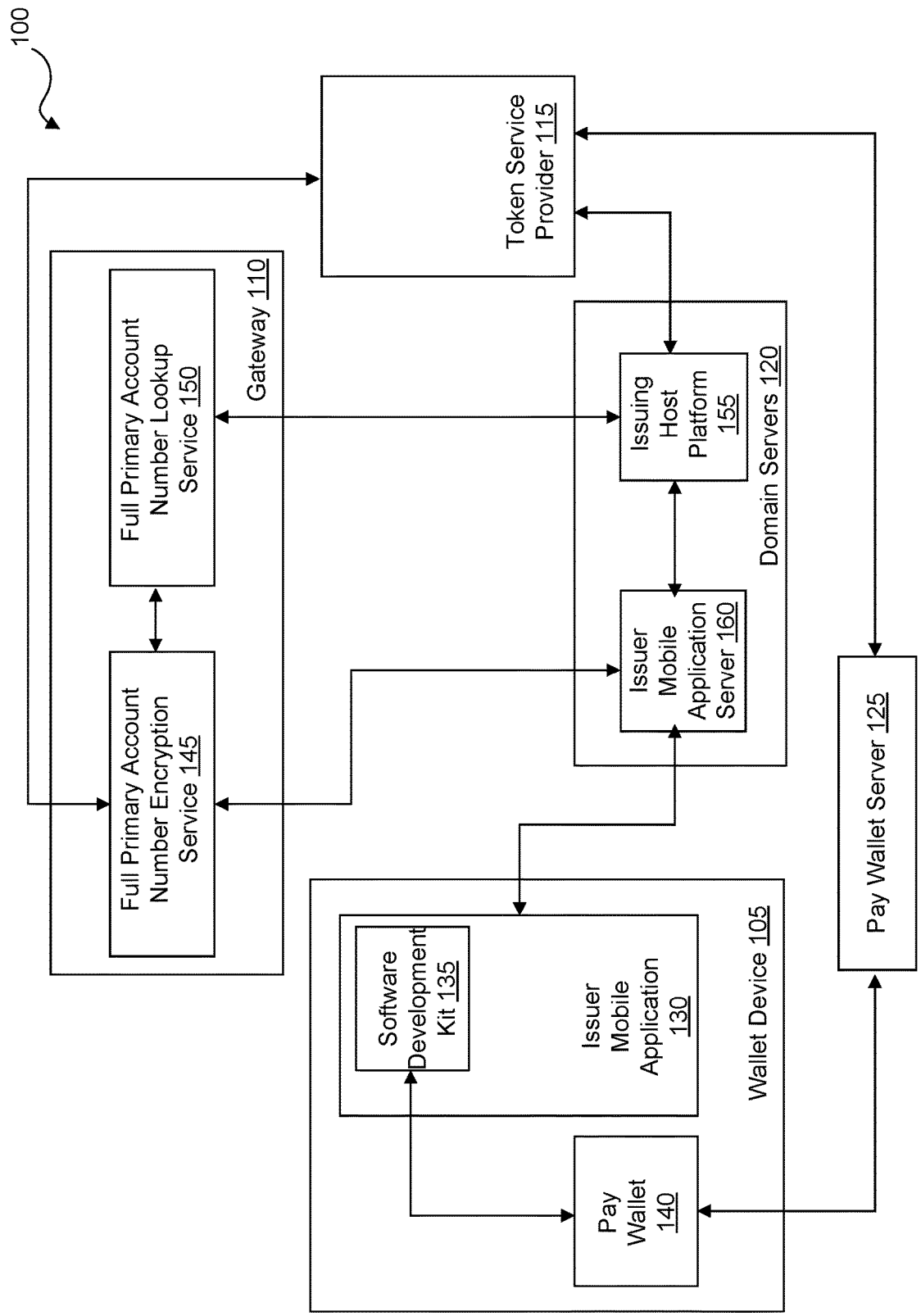
FIG. 1 illustrates a system for instant digital issuance of payment sources

Consumers paying for goods and services often use credit or debit cards as a payment method. However, payment using debit or credit cards for a user typically involves obtaining the account and then waiting for the card to arrive so that it can be used. For the card issuer, typically there are time and money costs involved in generating and shipping the card, which leaves the user unable to use the card to purchase goods and services until the card arrives. Both issuers and users (i.e., consumers) would benefit from the ability of an issuer to instantly issue a digital card to the user on a mobile device.

Many users have secure mobile devices that are personally owned and used. For example, many users have a mobile cellular telephone and/or tablet. A mobile device may include a digital pay wallet. A pay wallet may be software on the mobile device that allows a user to link a payment source (e.g., credit or debit card) to the mobile device so that the payment source can be used to purchase goods and services without having a physical card or check, for example. Often near field communication is used between the point-of-sale device and the mobile device to securely provide the payment information from the mobile device to the point-of-sale device.

In some existing systems, the user of the mobile device typically uses the physical card information to set up the pay wallet with the payment source. For example, a user can use a pay wallet application on their mobile device and either take a picture of the physical card or manually enter the information from the physical card to add the card to their pay wallet in this manner. This type of provisioning of a card into a pay wallet is typically termed pull provisioning. The payment source information is "pulled" into the pay wallet. The user is limited, however, to waiting until the physical card arrives to provision the card into the pay wallet. Entering the physical card information, however, assures the pay wallet provider, the issuer, and the token service provider that the user is the owner of the payment source. As such the user can be authenticated for provisioning the payment source into the pay wallet.

Described herein are methods and systems for facilitating push provisioning, which may allow an issuer to provide a button in an issuer's mobile application for the user to simply push the button to request that the payment source be imported into the user's pay wallet. In this way, the payment source information is "pushed" into the pay wallet. Using push provisioning, the user need not enter any physical card information. However, the user must be authenticated properly to prove to each of the issuer, the pay wallet provider, and the token service provider that the user owns the payment method.

In existing systems, various different pay wallet providers and issuers have differing requirements for provisioning a payment source into a pay wallet. Because of the complications associated with tracking the various requirements of each pay wallet provider, issuers are reluctant to implement push provisioning in their issuer mobile applications. Described herein is a software development kit for including by an issuer in the issuer's mobile application that provides the interfaces for easily implementing push provisioning with any pay wallet provider.

Further, in existing systems, obtaining the primary account number ("PAN") data and appropriately encrypting the information varies by token service provider, making the issuer even more reluctant and sometimes simply unable to implement push provisioning. In addition to the software development kit, the described solution provides a PAN gateway lookup service and a PAN gateway encryption service with which the software development kit can interface for ensuring that the push provisioning works not only with any pay wallet but with any token service provider.

FIG. 1 illustrates a system 100 for instant digital issuance of payment sources. The system 100 can include a wallet device 105, a gateway 110, a token service provider 115, domain servers 120, and a pay wallet server 125.

The wallet device 105 may be any suitable device that can support a digital wallet. The wallet device 105 may be computer system 400 as described with respect to FIG. 4. The wallet device 105 may be, for example, a mobile cellular telephone, a tablet, a personal digital assistant, or the like. The wallet device 105 (also referred to herein as a user device or a mobile device) may include a pay wallet 140 and an issuer mobile application 130. While only a single wallet device 105 is depicted in FIG. 1, any number of wallet devices 105 may be supported within system 100.

The pay wallet 140 may be any suitable digital wallet. The pay wallet 140 may be implemented as a software application installed and executed upon the wallet device 105. Currently digital wallets are available from multiple vendors including, for example, Apple Pay® from Apple Inc., Google Pay™ from Google LLC, and Samsung Pay® from Samsung.

The issuer mobile application 130 may be a software user interface application provided by the card issuer. The card issuer may be any suitable payment source (e.g., debit or credit card) issuer. Example card issuers include, for example, JPMorgan Chase & Co, Wells Fargo, Bank of America Corporation, Capital One, and so forth. Each issuer may provide an issuer mobile application 130. The issuer mobile application 130 may be a software application that is installed on the wallet device 105 and allows the user to access the user's account information with the issuer.

The issuer mobile application 130 may incorporate a software development kit 135. The software development kit 135 may provide interfaces and methods for interfacing with pay wallet 140 and domain servers 120 that facilitate push provisioning of a payment source from the issuer that provides issuer mobile application 130 into the pay wallet 140 for use on the wallet device 105.

The token service provider 115 may provide a token service for digital use of the payment source. For example, when sending digital payment information, the full account information, such as the sixteen digit account number may not be sent to protect the account information. Rather, a token may be generated and assigned to the sixteen digit account number. The token service provider 115 may receive and validate the push provision request with the encrypted provision data and activation data. The token service provider 115 may authorize the token and provide notification of the approval to the pay wallet server 125 as well as the issuing host platform 155. While only one token service provider 115 is depicted in FIG. 1, any number of token service providers 115 may be included in system 100. Token service provider 115 may be, for example First Data universal token service by First Data Corporation or Visa token service by Visa Inc. The token service provider 115 may be a service provided on a computer system (e.g., a server) such as computer system 400 of FIG. 4.

The domain servers 120 may include the issue mobile application server 160 and the issuing host platform 155. The domain servers 120 may be any suitable servers the issuer of the payment source provides and may be computer systems 400 of FIG. 4. The issuer mobile application server 160 may be a server managed by the issuer that the issuer mobile application 130 interfaces with to obtain user account information for display in the user interface of the issuer mobile application 130 on the user's wallet device 105. The issuing host platform 155 may be the host server managed by the issuer that stores and manages all user account information.

Figure 4:
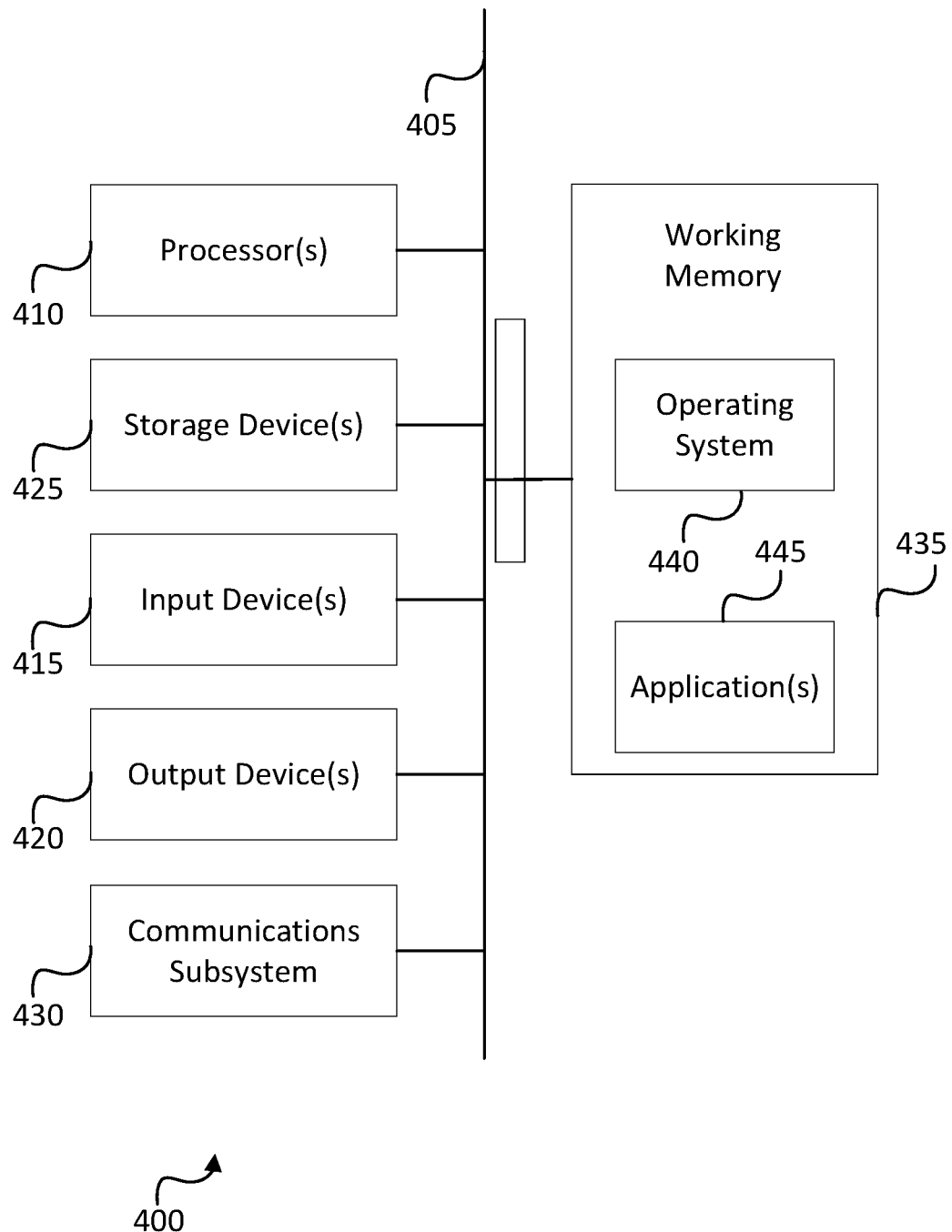
FIG. 4 illustrates an exemplary computer system.

The pay wallet server 125 may be any suitable server provided by the pay wallet provider (e.g., Google LLC for Google Pay, Samsung for Samsung Pay®, and so forth), such as for example computer system 400 of FIG. 4. The pay wallet server 125 may interface between the token service provider 115 and the pay wallet 140 to provision the payment source in the pay wallet 140. While a single pay wallet server 125 is depicted in FIG. 1, any number of pay wallet servers 125 may be included in system 100.

The gateway 110 may include full PAN encryption service 145 and full PAN lookup service 150. The gateway may be one or more servers that are hosted on a network (not shown) for communication with the domain servers 120 and the token service provider 115. The gateway 110 may be computer system 400 of FIG. 4. While a single gateway 110 is shown in FIG. 1, any number of gateways 110 may be included. The full PAN encryption service 145 and the full PAN lookup service 150 provided by gateway 110 provide a many-to-many gateway service for encrypting PAN data. Each pay wallet server 125 has specific encryption requirements that differ. For example, Apple Pay® has different encryption requirements than Samsung Pay®. Further, each token service provider 115 has differing encryption requirements. For example, First Data universal token service has different encryption requirements than Visa token service. The combination of digital wallet (e.g., Apple Pay®, Samsung Pay®, or the like) and token service provider (e.g., Visa token service, First Data universal token service, or the like) each has a unique combination of encryption requirements that complicate push provisioning for an issuer to implement push provisioning in the issuer's mobile application. The gateway 110 with the full PAN encryption service 145 and the full PAN lookup service 150 in combination with the software development kit 135 provide a technical solution that simplifies implementing push provisioning in the issuer's mobile application (issuer mobile application 130).

The full PAN lookup service 150 and the full PAN encryption service 145 may be software services installed upon the gateway 110 for providing their respective services as described in more detail herein.

The full PAN lookup service 150 may provide lookup services of a user's PAN from an issuing host platform 155. The full PAN lookup service 150 may obtain the information for a user account including the full sixteen digit account number, a card nickname, an associated address of the user, credentials (e.g., user name of the user) from the issuer mobile application 130, and so forth. The full PAN lookup service 150 is optional. In some embodiments, the issuer may provide the full sixteen digit account number and all other necessary information such that the full PAN lookup service 150 is not used.

The full PAN encryption service 145 may obtain the user account information from the full PAN lookup service 150 and prepare encrypted provision data used to complete the push provisioning as described in detail herein. The encrypted provision data is encrypted and signed by the full PAN encryption service 145. The encryption is completed using an encryption key provided to the full PAN encryption service 145 by the token service provider 115. Each token service provider 115 provides an encryption key for encryption of user data. In some embodiments. The token service provider 115 provides a single encryption key for all user accounts that use the token service provider 115, and in some embodiments an encryption key unique to each issuer is provided. The encryption ensures that only the destined token service provider 115 or the destined pay wallet server 125 can decrypt the data. The encryption provision data is also signed by the full PAN encryption service 145 using a validation key established by the full PAN encryption service 145 and exchanged with the token service provider 115. The signature ensures the token service provider 115 can validate the signature in the provision request to ensure the chain of trust is complete as described in more detail herein.

Figure 2:
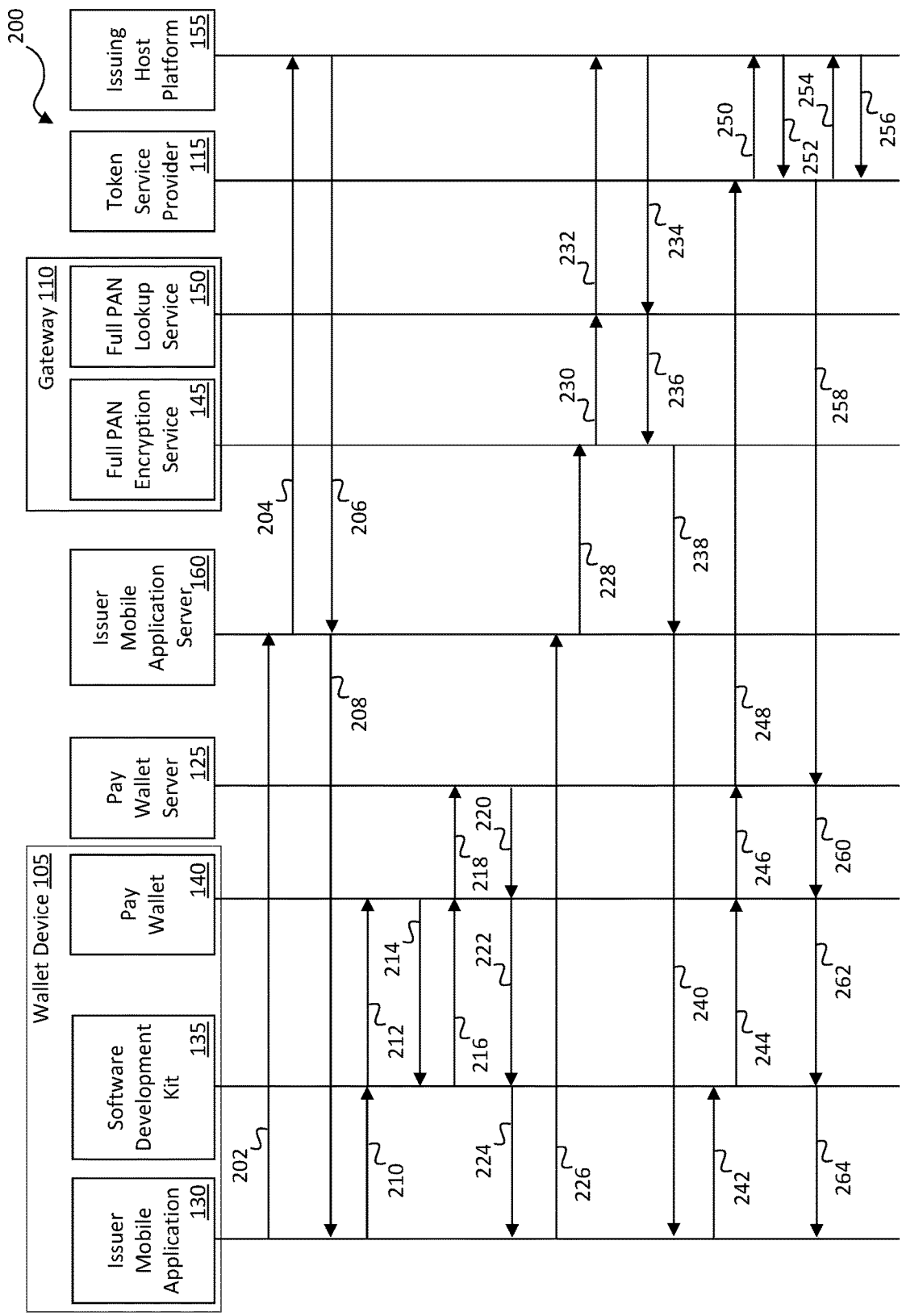
FIG. 2 illustrates a swim diagram for instant digital issuance of payment sources.

FIG. 2 illustrates a swim diagram 200 of a method for instant digital issuance of a payment source using the components described with respect to FIG. 1. Along the top of the swim diagram 200, the components described with respect to FIG. 1 are shown including the wallet device 105, issuer mobile application 130, software development kit 135, pay wallet 140, pay wallet server 125, issuer mobile application server 160, gateway 110, full PAN encryption service 145, full PAN lookup service 150, token service provider 115, and issuing host platform 155.

Beginning with the issuer mobile application 130, as arrow 202, the issuer mobile application 130 transmits user information entered by the user using the user interface of the issuer mobile application 130. The user information is transmitted to the issuer mobile application server 160.

The issuer mobile application server 160 may authenticate the user using the user information (e.g., a user name and password, biometric data, and so forth). The issuer mobile application server 160 may transmit a request, shown by arrow 204, to issuing host platform 155 for a list of eligible accounts for the user. The eligible accounts may include any user accounts the issuer has recorded for the user. For example, a user may have one or more checking or savings accounts associated with one or more debit cards and/or one or more credit cards from the same issuer (e.g., Wells Fargo, Capital One, and so forth).

The issuing host platform 155 may transmit the full PAN suffix data (e.g., the last four digits of the sixteen digit account number) for each eligible account for the user to the issuer mobile application server 160 as shown by arrow 206. The issuer mobile application server 160 may transmit the full PAN suffix data to the issuer mobile application 130 as shown by arrow 208. The issuer mobile application 130 may not maintain account information for the user on the wallet device 105, so all account information may be obtained from the issuer mobile application server 160 for display in the user interface of the issuer mobile application 130.

Once the issuer mobile application 130 has obtained the full PAN suffix data, the issuer mobile application 130 can invoke methods provided by the software development kit 135 as shown by arrow 210. Arrow 212 indicates that the software development kit 135 may include a method to query the pay wallet 140 for whether the full PAN suffix data identifies an account (i.e., payment source) that has previously been provisioned by the pay wallet 140. If the account has previously been provisioned by the pay wallet 140, there is no need to provision the account again. However, if the account has not previously been provisioned by the pay wallet 140, the user may wish to use push provisioning to provision the pay source into the pay wallet 140.

The pay wallet 140 may respond to the query, as shown by arrow 214, with information indicating whether the account associated with the full PAN suffix data for each eligible account has previously been provisioned.

If at least one account has not previously been provisioned, the software development kit 135 may invoke another method to request wallet data for push provisioning. Wallet data may include, for example, a wallet identifier (i.e., an identifier for pay wallet 140), a device identifier (e.g., an Internet Protocol address for wallet device 105, a media access control ("MAC") address for wallet device 105, or any other suitable identifier for wallet device 105), a binding identifier or a digital signature that binds the user to the pay wallet 140, a name of the wallet device 105, the push provision request (used to prevent the request from being replayed or spoofed), a wallet certificate that contains a public key for encrypting PAN data to be sent back to the pay wallet server 125, and the like. For simplicity of explanation, only a single account provision is described, but multiple accounts from an issuer may be provisioned into pay wallet 140 in parallel or serially. The software development kit 135 may request the wallet data from the pay wallet 140 as shown by arrow 216. The pay wallet 140 may request the wallet data from the pay wallet server 125 as shown by arrow 218. The pay wallet server 125 may provide the wallet data for the account to the pay wallet 140 as shown by arrow 220. The pay wallet 140 may provide the wallet data to the software development kit as shown by arrow 222. The software development kit 135 may provide the wallet data to the issuer mobile application 130 as shown by arrow 224. The issuer mobile application 130 may then display a button within the user interface of the issuer mobile application 130. The button, when pressed by the user, may invoke the push provisioning process for adding the account to the pay wallet 140.

Arrow 226 may transmit the wallet data from the issuer mobile application 130 to the issuer mobile application server 160 when the user pushes the button within the issuer mobile application 130 to invoke the push provisioning process for adding the payment source (i.e., eligible account for which the full PAN suffix data was obtained) to the pay wallet 140.

The issuer mobile application server 160 may authenticate the user and confirm the authenticity of the received information. Once authenticated, the issuer mobile application server 160 may provide the account information (e.g., the user name, the full PAN suffix data, and so forth), the wallet data, and an issuer nonce to the Full PAN encryption service 145 as shown by arrow 228. The issuer nonce may be a randomly generated identifier that indicates that the user has been authenticated by the issuer mobile application server 160 (the user was previously authenticated at arrow 202) and is used in the push provision request for the transaction beginning at arrow 228. Optionally, the PAN data including the full sixteen digit account number may have been provided to the full PAN encryption service 145 from the issuer mobile application server 160 as well.

The full PAN encryption service 145 may determine whether a full PAN lookup is needed based on whether the full PAN encryption service 145 has the PAN data. If the full PAN encryption service 145 does not have the PAN data, the full PAN encryption service 145 may transmit the account information, the wallet data, and the issuer nonce to the full PAN lookup service 150 as shown by arrow 230.

The full PAN lookup service 150 may request the PAN data from the issuing host platform 155 as shown by arrow 232. The request may include the user information, account information, and/or credentials obtained from the issuer mobile application server sent through the full PAN encryption service. The issuing host platform 155 may search a database or other data source using the user information, account information, and/or credentials to identify the requested PAN data. The issuing host platform 155 may return the PAN data to the full PAN lookup service 150 as shown by arrow 234. The PAN data may include the full sixteen digit account number, the user's address, and/or the payment source (e.g., credit card) nickname.

As shown by arrow 236, the PAN data may be transmitted from the full PAN lookup service 150 to the full PAN encryption service 145. The full PAN encryption service may encrypt the PAN data to create encrypted provision data. Optionally, the user information, account information, wallet data, issuer nonce, PAN data, user's address, and/or card nickname may be included with the PAN data and encrypted. The full PAN encryption service 145 may encrypt the PAN data (including the user information, account information, wallet data, issuer nonce, PAN data, user's address, and/or card nickname) using an encryption key and may digitally sign the PAN data using a validation key. The encryption key and/or the validation key may be set with the token service provider information. In other words, the encryption key and/or the validation key may identify the token service provider. The encryption key and/or the validation key may be obtained from the issuer when the issuer registers with the gateway 110, which may optionally include registering with the full PAN encryption service 145 and/or the full PAN lookup service 150. Optionally, the encryption key and/or the validation key may be established directly between the full PAN encryption service 114 and the token service provider 115, and all provision requests for issuers that use that token service provider 115 have data that is encrypted with the encryption key and signed with the validation key for that token service provider 115. Optionally, multiple issuers may utilize the same encryption key and/or validation key. When the full PAN encryption service 145 obtains an encryption and/or validation key, the encryption and/or validation key may be stored with other keys in a database or other storage location accessible to the full PAN encryption service 145. The full PAN encryption service 145 may search the key database using, for example, the primary account number data. As an example, the first four digits of a sixteen digit account number may identify an issuer, so the database may be queried using the first four digits of the sixteen digit account number from the PAN data to identify the encryption key and/or validation key. As another example, the issuer may be identified based on the PAN data and the database may be queried using the issuer for the encryption key and/or validation key. Optionally, the PAN data encrypted with the encryption key may also be encrypted with the wallet certificate from the wallet data. The wallet certificate may include a public key used for encrypting the PAN data. The pay wallet server 125 may have the corresponding private key for decryption that the pay wallet server may use to decrypt the PAN data as described below.

In some embodiments, the validation key is unique to the issuer and the token service provider. In other embodiments, the token service provider permits the full PAN encryption gateway to use the same validation key across multiple issuers processed by that gateway because the gateway performs mutual authentication with the issuer server, and the token service provider trusts the gateway's authentication of the issuer server. Using the same validation key across multiple issuers speeds up the implementation timeline for enabling this gateway service for a new issuer. The chain of trust generated by the process is sufficient to ensure security. For example, the chain of trust is that the issuer authorizes the user and sends the request to the encryption gateway. The encryption gateway has mutual authentication of the issuer and signs the request payload with a key trusted by the token service provider. Accordingly, because the request is encrypted with a trusted key by a trusted partner that in turn has authenticated the issuer, and the issuer has in turn authenticated the user, the token service provider can be assured that the user is validly requesting the provisioning of the payment source into the user's digital pay wallet.

As discussed above with respect to gateway 110 of FIG. 1, the token service provider 115 and the pay wallet server 125 may each have different encryption requirements. Further, for any given push provision request, any available digital wallet (i.e., pay wallet server 125) and any available token service provider (i.e., token service provider 115) may be used so that any given push provision request may require any combination of encryption requirements that meet both the selected token service provider encryption requirements and the digital wallet encryption requirements. The full PAN encryption service 145 may identify the set of encryption requirements for the token service provider identified by the encryption key. The full PAN encryption service 145 may also identify the set of encryption requirements for the pay wallet server 125 based on the wallet data included with the PAN data. The encryption requirements for all available token service providers 115 may be stored in a database available to full PAN encryption service 145. The encryption requirements for all available pay wallet servers 125 may also be stored in a database available to full PAN encryption service 145. Full PAN encryption service 145 may identify each set of encryption requirements (i.e., the set of encryption requirements for the token service provider and the set of requirements for the pay wallet server) and ensure the encryption of the PAN data complies with each set of requirements. Example requirements may include the type of encryption algorithm (e.g., symmetric-key algorithm, format-preserving algorithm, and so forth) that may be used, the minimum length of the encryption key (e.g., 128-bit key, 256-bit key, and so forth) that may be used, and so forth.

Once the full PAN encryption service 145 has generated the encrypted provision data, the full PAN encryption service 145 may transmit the encrypted provision data to the issuer mobile application server 160 as shown by arrow 238. The issuer mobile application server 160 may transmit the encrypted provision data to the issuer mobile application 130 as shown by arrow 240. The issuer mobile application 130 may invoke an add card method that may call methods within the software development kit 135 as shown by arrow 242.

The software development kit 135 may initiate a request to add the card to the pay wallet 140 by transmitting the encrypted provision data to the pay wallet 140 as shown by arrow 244. The pay wallet may transmit the provision request to the pay wallet server 125 by transmitting the encrypted provision data as shown by arrow 246. The pay wallet server 125 may transmit the provision request and the encrypted provision data to the token service provider 115 as shown by arrow 248.

The token service provider 115 may use the encryption key to decrypt the encrypted provision data and may use the validation key to authenticate the data as from the encryption gateway. The token service provider 115 may identify within the decrypted provision data the account information including the PAN data (e.g., the sixteen digit account number), the user information, the wallet data, and so forth, and use the identified information to generate a token to be used by the user within the pay wallet 140. The token service provider 115 may transmit a provision authorization, including the token and the issuer nonce, to the issuing host platform 155 as shown by arrow 250.

The issuing host platform 155 may store the token with the PAN data. Optionally, the issuer mobile application 130 may have previously sent the issuer nonce to the issuing host platform 155 (not depicted in FIG. 2). The issuing host platform 155 may check the issuer nonce from the issuer mobile application 130 against the issuer nonce received at 250 to confirm that the push provision request was authenticated by the issuer mobile application server 160, thereby validating the chain-of-trust. The issuing host platform may transmit an acknowledgement to the token service provider 115 as shown by arrow 252. The token service provider may then transmit a provision notification to the issuing host platform 155 as shown by arrow 254, and the issuing host platform 155 may transmit an acknowledgement to the token service provider 115 as shown by arrow 256. After these acknowledgements, the token service provider 115 and the issuing host platform 155 both acknowledge the token and consider the account provisioned into the pay wallet 140.

The token service provider 115 then transmits the provision response (e.g., successful provisioning indicated by the token, which is also transmitted) to the pay wallet server 125 as shown by arrow 258. The pay wallet server 125 then stores the token with the user information and account information so that future requests to determine whether the add button should be included in the issuer mobile application will result in a negative response. Further, the pay wallet 140 will obtain the token from the pay wallet server 125 to allow the user to use the payment source (i.e., account associated with the token) from the pay wallet 140. The pay wallet server 125 transmits the token to the pay wallet 140 as shown by arrow 260. The pay wallet 140 transmits the token and/or a success or failure message indicating whether the payment source was successfully provisioned or not to the software development kit 135 as shown by arrow 262. The software development kit 135 transmits the token and/or the success or failure message to the issuer mobile application 130 as shown by arrow 264. The issuer mobile application 130 then optionally displays a notification to the user that the account was successfully provisioned into the pay wallet 140 or indicates a failure if the provisioning was unsuccessful.

Figure 3:
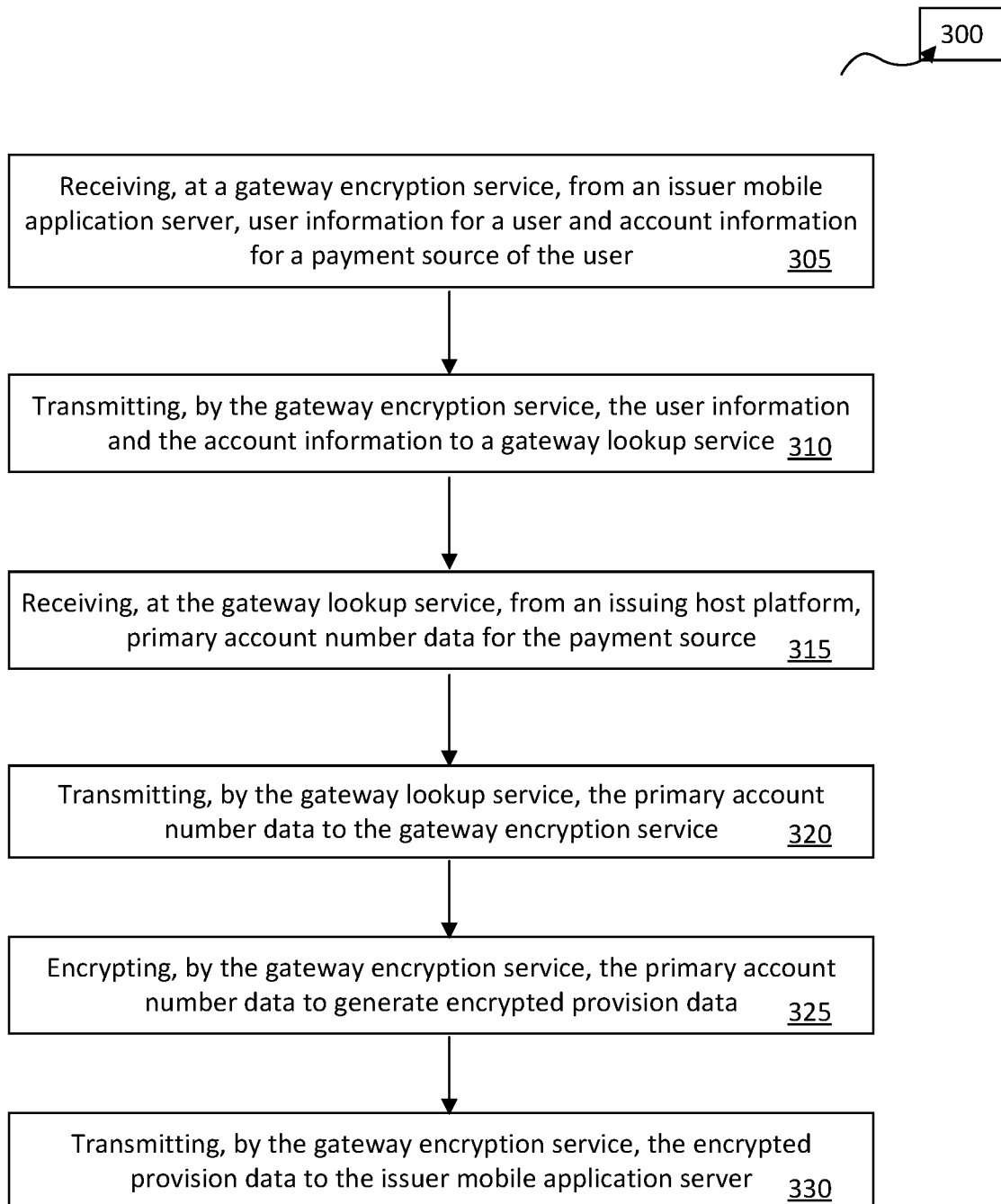
FIG. 3 illustrates a method for instant digital issuance of payment sources.

FIG. 3 illustrates a method 300 for instant digital issuance of a payment source. The method may be performed by the gateway 110 as described with respect to FIG. 1. The method 300 begins at block 305 with the gateway encryption service (e.g., full PAN encryption service 145 of FIG. 1) receiving user information for a user and account information for a payment source of the user from an issuer mobile application server (e.g., issuer mobile application server 160). Optionally, the user information and account information is transmitted to the gateway encryption service in response to a user requesting push provisioning of the account into a pay wallet from the issuer's mobile application.

At block 310, the gateway encryption service may transmit the user information and the account information to a gateway lookup service (e.g., full PAN lookup service 150 of FIG. 1). The account information may include a PAN suffix (e.g., the last four digits of the sixteen digit account number), the user's name, the user's credentials (e.g., a username and password, biometric data including a fingerprint or iris scan, and/or so forth), wallet data for the pay wallet into which the user wishes to provision the account, an issuer nonce, and so forth.

At block 315, the gateway lookup service may receive PAN data for the payment source from an issuing host platform. The gateway lookup service may have transmitted the PAN suffix, the user's name, the user's credentials, the wallet data, and/or the issuer nonce to the issuing host platform requesting the PAN data. The PAN data may include the sixteen digit account number, the user's address, and/or a nickname the user may have assigned to the account.

At block 320, the gateway lookup service may provide the PAN data to the gateway encryption service. At block 325, the gateway encryption service may encrypt the PAN data to generate encrypted provision data. The gateway encryption service may use an encryption key to encrypt the data and a validation key to sign the data. The encryption key and validation key may be set with a specific token service provider for the issuer that the issuer may have provided to the gateway encryption service. In some embodiments, the encryption key and the validation key used for a token service provider is used for all issuers that use that token service provider. The gateway encryption service may user the encryption key to encrypt the PAN data. Optionally, the gateway encryption service may combine the PAN data, the user's credentials, the PAN suffix, the user's name, the wallet data, and/or the issuer nonce before encrypting with the encryption key. The gateway encryption service also signs the data with the validation key. Optionally, the gateway encryption service may further encrypt the encrypted data with the wallet certificate. The encrypted provision data is any or all of the above described data that was combined and encrypted with the encryption key and/or the wallet certificate.

At block 330, the gateway encryption service may transmit the encrypted provision data to the issuer mobile application server, which can be used to finalize the push provisioning process as described in detail with respect to FIG. 2.

FIG. 4 illustrates an embodiment of a computer system 400. A computer system 400 as illustrated in FIG. 4 may be incorporated into devices such as a personal computer, server computer, mobile device (e.g., smartphone, smart watch, tablet, and the like), point of service ("POS") terminal, and the like. FIG. 4 provides a schematic illustration of one embodiment of a computer system 400 that can perform some or all of the steps of the methods provided by various embodiments. It should be noted that FIG. 4 is meant only to provide a generalized illustration of various components, any or all of which may be utilized as appropriate. FIG. 4, therefore, broadly illustrates how individual system elements may be implemented in a relatively separated or relatively more integrated manner.

The computer system 400 is shown comprising hardware elements that can be electrically coupled via a bus 405, or may otherwise be in communication, as appropriate. The hardware elements may include one or more processors 410, including without limitation one or more general-purpose processors and/or one or more special-purpose processors such as digital signal processing chips, graphics acceleration processors, and/or the like; one or more input devices 415, which can include without limitation a mouse, a keyboard, a camera, a remote control, and/or the like; and one or more output devices 420, which can include without limitation a display device, a printer, and/or the like.

The computer system 400 may further include and/or be in communication with one or more non-transitory storage devices 425, which can comprise, without limitation, local and/or network accessible storage, and/or can include, without limitation, a disk drive, a drive array, an optical storage device, a solid-state storage device, such as a random access memory ("RAM"), and/or a read-only memory ("ROM"), which can be programmable, flash-updateable, and/or the like. Such storage devices may be configured to implement any appropriate data stores, including without limitation, various file systems, database structures, and/or the like.

The computer system 400 might also include a communications subsystem 430, which can include without limitation a modem, a network card (wireless or wired), an infrared communication device, a wireless communication device, and/or a chipset such as a Bluetooth® device, an 802.11 device, a Wi-Fi device, a WiMax device, cellular communication facilities, etc., and/or the like. The communications subsystem 430 may include one or more input and/or output communication interfaces to permit data to be exchanged with a network such as the network described below to name one example, other computer systems, television, and/or any other devices described herein. Depending on the desired functionality and/or other implementation concerns, a portable electronic device or similar device may communicate transaction and/or other information via the communications subsystem 430. In other embodiments, a portable electronic device, may be incorporated into the computer system 400 (e.g., an electronic device), as an input device 415. In many embodiments, the computer system 400 will further comprise a working memory 435, which can include a RAM or ROM device, as described above.

The computer system 400 also can include software elements, shown as being currently located within the working memory 435, including an operating system 440, device drivers, executable libraries, and/or other code, such as one or more application programs 445, which may comprise computer programs provided by various embodiments, and/or may be designed to implement methods, and/or configure systems, provided by other embodiments, as described herein. Merely by way of example, one or more procedures described with respect to the methods discussed above, such as those described in relation to FIG. 6, might be implemented as code and/or instructions executable by a computer and/or a processor within a computer; in an aspect, then, such code and/or instructions can be used to configure and/or adapt a general purpose computer or other device to perform one or more operations in accordance with the described methods.

A set of these instructions and/or code might be stored on a non-transitory computer-readable storage medium, such as the storage device(s) 425 described above. In some cases, the storage medium might be incorporated within a computer system, such as computer system 400. In other embodiments, the storage medium might be separate from a computer system (e.g., a removable medium), such as a compact disc, and/or provided in an installation package, such that the storage medium can be used to program, configure, and/or adapt a general purpose computer with the instructions/code stored thereon. These instructions might take the form of executable code, which is executable by the computer system 400 and/or might take the form of source and/or installable code, which, upon compilation and/or installation on the computer system 400 (e.g., using any of a variety of generally available compilers, installation programs, compression/decompression utilities, etc.), then takes the form of executable code.

It will be apparent to those skilled in the art that substantial variations may be made in accordance with specific requirements. For example, customized hardware might also be used, and/or particular elements might be implemented in hardware, software including portable software, such as applets, etc., or both. Further, connection to other computing devices such as network input/output devices may be employed.

As mentioned above, in one aspect, some embodiments may employ a computer system such as the computer system 400 to perform methods in accordance with various embodiments of the technology. According to a set of embodiments, some or all of the procedures of such methods are performed by the computer system 400 in response to processor 410 executing one or more sequences of one or more instructions, which might be incorporated into the operating system 440 and/or other code, such as an application program 445, contained in the working memory 435. Such instructions may be read into the working memory 435 from another computer-readable medium, such as one or more of the storage device(s) 425. Merely by way of example, execution of the sequences of instructions contained in the working memory 435 might cause the processor(s) 410 to perform one or more procedures of the methods described herein. Additionally or alternatively, portions of the methods described herein may be executed through specialized hardware.

The terms "machine-readable medium" and "computer-readable medium," as used herein, refer to any medium that participates in providing data that causes a machine to operate in a specific fashion. In an embodiment implemented using the computer system 400, various computer-readable media might be involved in providing instructions/code to processor(s) 410 for execution and/or might be used to store and/or carry such instructions/code. In many implementations, a computer-readable medium is a physical and/or tangible storage medium. Such a medium may take the form of a non-volatile media or volatile media. Non-volatile media include, for example, optical and/or magnetic disks, such as the storage device(s) 425. Volatile media include, without limitation, dynamic memory, such as the working memory 435.

Common forms of physical and/or tangible computer-readable media include, for example, a floppy disk, a flexible disk, hard disk, magnetic tape, or any other magnetic medium, a CD-ROM, any other optical medium, punch-cards, papertape, any other physical medium with patterns of holes, a RAM, a PROM, EPROM, a FLASH-EPROM, any other memory chip or cartridge, or any other medium from which a computer can read instructions and/or code.

Various forms of computer-readable media may be involved in carrying one or more sequences of one or more instructions to the processor(s) 410 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 400.

The communications subsystem 430 and/or components thereof generally will receive signals, and the bus 405 then might carry the signals and/or the data, instructions, etc. carried by the signals to the working memory 435, from which the processor(s) 410 retrieves and executes the instructions. The instructions received by the working memory 435 may optionally be stored on a non-transitory storage device 425 either before or after execution by the processor(s) 410.

Figure 5:
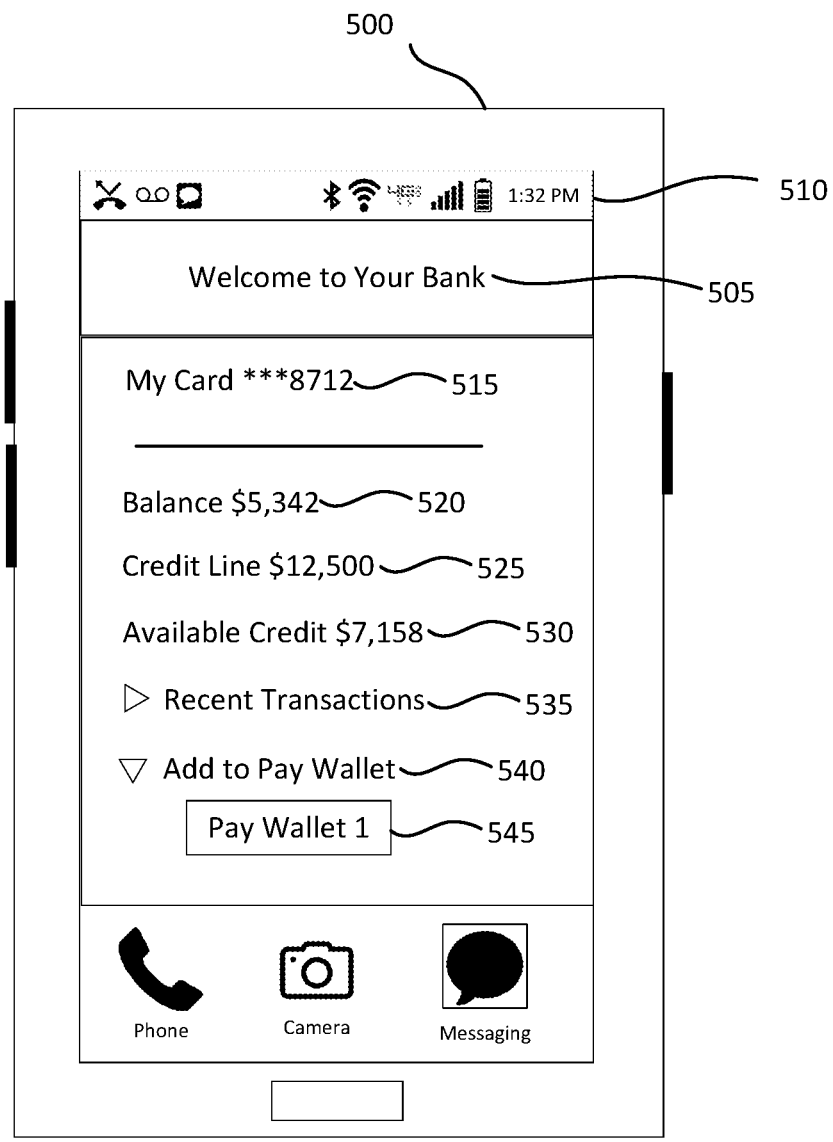
FIG. 5 illustrates an exemplary user interface for instant digital issuance of payment sources.

FIG. 5 illustrates an exemplary mobile device 500 (e.g., wallet device 105) which is displaying a user interface of the issuer mobile application (e.g., issuer mobile application 130). The user interface may be for a card issuer, which may be displayed in a banner 505, in this case "Your Bank" is the issuer. The card nickname ("My Card") and the PAN suffix data ("8712") is displayed as shown at 515. A balance 520, credit line 525, and available credit 530, for example, may be shown in the user interface. A collapsible link 535 for recent transaction may be available. Further, a collapsible link 540 for adding an account to a pay wallet may be available. Once the collapsible link 540 is selected, the button 545 for push provisioning the account, which has an associated nickname of "My Card" and a PAN suffix of 8712, into Pay Wallet 1. The button 545 may be provided as a result of the actions described in the swim diagram 200 associated with arrows 202, 204, 206, 208, 210, 212, 214, 216, 218, 220, 22, and 224. If the user selects the button 545 to initiate the push provisioning process, the actions described in swim diagram 200 beginning with arrow 226 may ensue to successfully complete the push provisioning process and make the account with PAN suffix 8712 available for use on the mobile device 500 within Pay Wallet 1.

Figure 6:
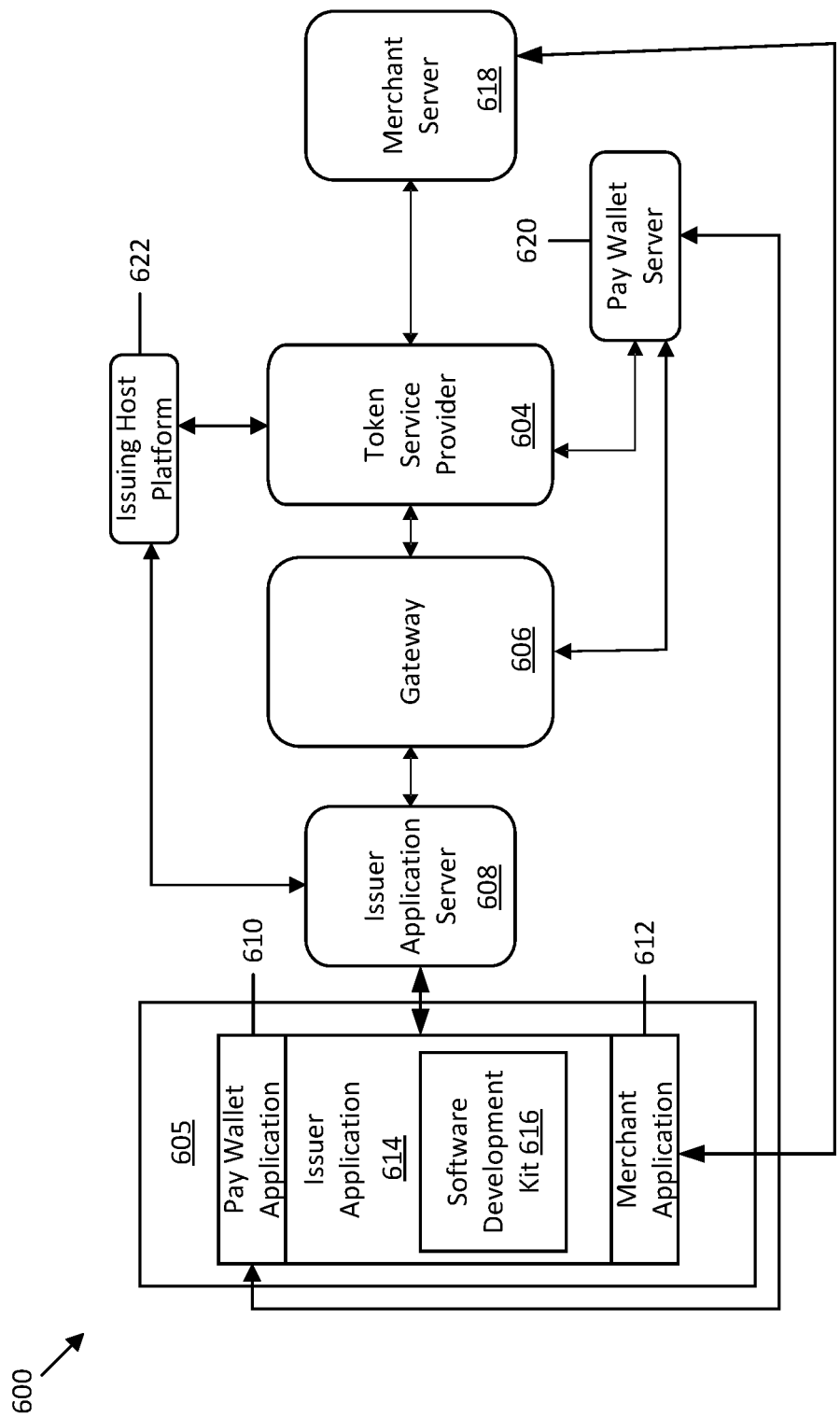
FIG. 6 illustrates an example block diagram of another push provisioning system, in accordance with some embodiments of the present disclosure.

Turning to FIG. 6, another example push provisioning system 600 is shown, in accordance with some embodiments of the present disclosure. Similar to the system 100 of FIG. 1, the push provisioning system 600 includes a client device 602 (e.g., the wallet device 105) in communication with a token service provider 604 via a gateway 606 and an issuer application server 608. The client device 602 may be any suitable device that a user (e.g., cardholder) may use to make a payment. For example, in some embodiments, the client device 602 may include a mobile cellular telephone, a tablet, a personal digital assistant, a laptop, a wearable device (e.g., smart watch, etc.), or the like. The client device 602 may be the computer system 400 as described above with respect to FIG. 4. In some embodiments, the client device 602 may be configured to access a pay wallet application 610 (e.g., similar to the pay wallet 140) and a merchant application 612.

In some embodiments, either or both of the pay wallet application 610 and the merchant application 612 may be a mobile application (e.g., software application) that is installed, and designed to run, on the client device 602. In other embodiments, either or both of the pay wallet application 610 and the merchant application 612 may be a web application (e.g., software application) that is configured to run on a web server and may be configured for access via a web browser. For example, in some embodiments, the user (e.g., cardholder) may open a web browser on the client device 602 and enter a web address (e.g., Uniform Resource Locator) associated with the pay wallet to access the pay wallet application 610 of that pay wallet. Similarly, in some embodiments, the user (e.g., cardholder) may open a web browser on the client device 602 and enter a web address (e.g., Uniform Resource Locator) associated with a merchant to access the merchant application 612 of that merchant. In some embodiments, the client device 602 may be configured to access a web application (whether the pay wallet application 610 or the merchant application 612) via the client device 602 and also have a mobile application ((whether the pay wallet application or the merchant application) installed on the client device.

While only a single pay wallet application (e.g., the pay wallet application 610) and a single merchant application (e.g., the merchant application 612) is shown on the client device 602, in other embodiments, the client device may have multiple pay wallet applications (e.g., one pay wallet application for each type of pay wallet) and multiple merchant applications (e.g., one merchant application for each merchant). Further, in some embodiments, the pay wallet application 610 may correspond to any suitable digital wallet. Example digital wallets may include, for example, Apple Pay® from Apple Inc., Google Pay™ from Google LLC, and Samsung Pay® from Samsung. In other embodiments, the pay wallet application 610 may correspond to other or additional digital wallets. Similarly, the merchant application 612 may correspond to any merchant (e.g., card-on-file merchants, click-to-pay merchants, etc.) that allows online transactions, or in other words, allows buying and/or selling products and/or services using the client device 602.

The client device 602 may also be configured to access an issuer application 614. In some embodiments, the issuer application 614 may be a mobile application (e.g., software application) that is installed, and designed to run on, the client device 602. In other embodiments, the issuer application 614 may be a web application that is run on a web server and may be accessed using a web browser on the client device 602. For example, in some embodiments, the user (e.g., cardholder) may open a web browser on the client device 602 and enter a web address (e.g., Uniform Resource Locator) associated with the issuer to access the issuer application 614 of that issuer. The issuer application 614 may be associated with an issuer of a payment source (also referred to herein as a payment instrument). For example, in some embodiments, the issuer application 614 may be associated with issuers such as JPMorgan Chase & Co, Wells Fargo, Bank of America Corporation, Capital One, etc. In other embodiments, the issuer application 614 may be associated with other or additional issuers. In some embodiments, the payment source may be any suitable payment mechanism. For example, in some embodiments, the payment source may be a debit card, a credit card, etc. Using the issuer application 614, the user (e.g., cardholder) may view account details, payment details, user profile details, advertisements, rewards, etc., and any other service or information that the issuer makes available to the user via the issuer application. In some embodiments, the user may also use the issuer application 614 to push provision a payment source issued by the issuer of the issuer application to a merchant or pay wallet.

The issuer application 614 may incorporate a software development kit 616. The software development kit 616 may include software tools and programs to provide interfaces and methods for facilitating the push provisioning operations to a pay wallet or to a merchant. In some embodiments, the software development kit 616 may be embedded into the issuer application 614 and may be configured for use both via a mobile application implementation of the issuer application or via a web application implementation of the issuer application. The software development kit 616 may be configured to hide the complexity of the push provisioning operation from the user. For example and as explained in greater detail below, in some embodiments, different token service providers (e.g., the token service provider 604), different merchants, and/or different pay wallets may have varying communication protocols (e.g., may require different messaging formats) and/or require different types of messages (e.g., different types of API calls) for performing the same or similar functions. In some embodiments, the operations for push provisioning to a merchant may be different from the operations for push provisioning to a pay wallet, which in turn may vary based upon the type of merchant or pay wallet, as well as whether the push provisioning is occurring through a mobile application or a web application. The software development kit 616 may be configured to hide all of this complexity from the user. From the user's standpoint, the software development kit 616 provides a set of simple interfaces that guide the user through the push provisioning process.

The software development kit 616 may be configured to interface with the pay wallet application 610 and the merchant application 612. For example, and as discussed below, the software development kit 616 may be configured to redirect the user between the issuer application 614 and the pay wallet application 610 if the user is push provisioning to a pay wallet or between the issuer application and the merchant application 612 if the user is push provisioning to a merchant. Although not shown, the software development kit 616 may include, or be associated with, computer-readable instructions that may be executed by a processor (e.g., a processor of the user device 602). In some embodiments, the computer-readable instructions may be located on the user device 602, while in other embodiments, the computer-readable instructions may be located remote (e.g., on a cloud) from the user device and accessible by the user device.

The token service provider 604 (e.g., similar to the token service provider 115) may provide a token service for digital use of the payment source. For example, when sending digital payment information, the full account information, such as the sixteen digit account or card number may not be sent to protect the account information. Rather, the token service provider 604 may generate a token and associate that token with the payment source. The token service provider 604 may receive and validate the push provision request by issuing a token for a payment source to a pay wallet or to a merchant. The token service provider 604 may be any of a variety of token service providers. For example, in some embodiments, the token service provider 604 may be a MasterCard Digital Enablement Service ("MDES") token service provider. In other embodiments, the token service provider 604 may be a Visa Token Service ("VTS") token service provider. In yet other embodiments, the token service provider 604 may be a First Data Universal Token Service token service provider. In other embodiments, the token service provider 604 may be any other type of a token service provider.

The token service provider 604 may be configured for communication with a merchant server 618, a pay wallet server 620, and an issuing host platform 622. The token service provider 604 may receive a push provisioning request from the merchant server 618 or the pay wallet server 620. In response, the token service provider 604 may determine that the push provisioning request is a valid request and generate a token (e.g., a payment token) for a payment source selected by the user (e.g., cardholder). The token service provider 604 may return the generated token to the merchant server 618 or the pay wallet server 620 that made the push provisioning request. In some embodiments, the token service provider 604 may also provide a notification of approval (and/or the generated token) to the issuing host platform 622. Although not shown, the token service provider 604 may include, or be associated with computer-readable instructions that may be executed by a processor.

The merchant server 618 (also referred to as a commerce server) may be associated with the merchant application 612. The merchant server 618 may be configured to handle transactions occurring via the merchant application 612. For example, in some embodiments, the merchant server 618 may be configured to establish a secure channel of communication between the user and the issuer of the payment source that the user is using to make a payment for a transaction (e.g., purchase) using the merchant application 612. Thus, the merchant server 618 may be configured to implement an electronic commerce protocol. In some embodiments, the merchant server 618 may be located remote from the merchant application 612. The merchant server 618 may include, or be associated with, computer-readable instructions that may be executed by a processor associated with the merchant server. The merchant server 618 may receive a push provisioning request to push provision a payment source to the merchant associated with the merchant server, and correspond with the token service provider 604 and/or the gateway 606 to receive a token for the payment source.

The pay wallet server 620 (similar to the pay wallet server 125) may be associated with the pay wallet application 610. The pay wallet server 620 may be configured to handle transactions occurring via the pay wallet application 610. For example, in some embodiments, the pay wallet server 620 may be configured to establish a secure channel of communication between the user and the issuer of the payment source that the user is using to a make payment for a transaction (e.g., purchase) using the pay wallet application 610. Thus, the pay wallet server 620 may be configured to implement an electronic commerce protocol. In some embodiments, the pay wallet server 620 may be located remote from the pay wallet application 610. The pay wallet server 620 may include, or be associated with, computer-readable instructions that may be executed by a processor associated with the pay wallet server. The pay wallet server 620 may receive a push provisioning request to push provision a payment source to the pay wallet associated with the pay wallet server, and correspond with the token service provider 604 and/or the gateway 606 to receive a token for the payment source.

The issuing host platform 622 may be associated with the issuer providing the issuer application 614. The issuing host platform 622 (similar to the issuing host platform 155) may be configured to store and/or manage user account information. Although the issuing host platform 622 is shown separate from the issuer application server 608, in some embodiments, the issuing host platform and the issuer application server may be combined together into a single system (e.g., the domain servers 120). The issuer application server 608 may be provided by the issuer associated with the issuer application 614. The issuer application server 608 may be configured to establish communication between the issuer application 614 and the gateway 606 or between the issuer application and the issuing host platform 622. The issuer application server 608 may include, or be associated with, computer-readable instructions that may be executed by a processor associated with the issuer application server.

The gateway 606 may be similar to the gateway 110. The gateway 606 may be configured to communicate with the software development kit 616 and the issuer application 614 via the issuer application server 608. For example, the gateway 614 may receive a request for information from the issuer application 614 via the issuer application server 608. The gateway 606 may need to communicate with the token service provider 604 to fulfill the request for information. In some embodiments, and as discussed above, different token service providers may employ different communication protocols. The gateway 606 may be configured to determine the type (e.g., MDES, VTS, etc.) of the token service provider 604, determine the communication protocol associated with the type of the token service provider, and format messages to the token service provider in accordance with the determined format. The gateway 606 is also configured to hide the complexity of the push provisioning operation from the user. Further, by virtue of the gateway 606, additional types of token service providers may be added without needing to alter the operations or functionality of the issuer application 614, the pay wallet application 610, the merchant application 612, the software development kit 616, or the issuer application server 608.

In some embodiments, the gateway 606 may include, or be associated with computer-readable instructions that may be executed by a processor associated with the gateway. In some embodiments, the software development kit 616 and the gateway 606 may be implemented by the same processor (even though the software development kit and the gateway may be located remote from one another). In other embodiments, the software development kit 616 and the gateway 606 may be implemented by separate processors.

Notwithstanding the elements shown in FIG. 6, it is to be understood that the push provisioning system 600 may include other or additional elements. Generally speaking, the push provisioning system 600 may include any element or component that may be considered desirable to have or may be needed in performing the functions described herein. Thus, the push provisioning system 600 enables a user (e.g., cardholder) to provide a tokenized payment card number to merchants and pay wallets for easy and secure transactions (e.g., purchases). The push provisioning system 600 allows a digital first experience to the user by permitting new account usage without needing to wait for a physical card activation. The push provisioning system 600 allows the user to complete transactions using any device (e.g., any web-enabled device) and provides a frictionless enablement of the payment source as the payment option in the merchant checkout flow. The push provisioning system 600 is configured to work with a variety of token requesting merchants and pay wallets through a variety of token service providers. The push provisioning system 600 provides a simple, normalized integration through the software development kit 616 and the gateway 606, as well as provides a one time provisioning of the payment source regardless of changes in the account status, account numbers, etc.

The push provisioning system 600 also provides technical improvements. Specifically, the push provisioning system 600 provides technical improvements in the area of computer networks. The push provisioning system 600 also improves the operations of the client device 602. For example, the push provisioning system 600 enables the user to push provision to both pay wallets and merchants using the same issuer application (e.g., the issuer application 614) via the software development kit 616. The push provisioning system 600 also allows the user to push provision to both the pay wallets and merchants using either mobile application or web application, thereby avoiding the need for the user to download specialized software and consuming additional memory and storage space on the client device. Thus, the push provisioning system 600 improves the storage capabilities of the client device 602. The push provisioning system 600 also allows the client device 602 to hide the complexity of the push provisioning process by providing simple interfaces regardless of which token service provider is used, which merchant or pay wallet is being provisioned to, and what communication protocols they follow. The push provisioning system 600 simplifies communications over the network by using simple Application Program Interface ("API") messages and calls, and automatically formatting the messages in accordance with the preferred communication protocol of the recipient (e.g., the token service provider). The problems being addressed by the push provisioning system 600 are specific to transactions occurring over the web using the client device 602.

Figure 7:
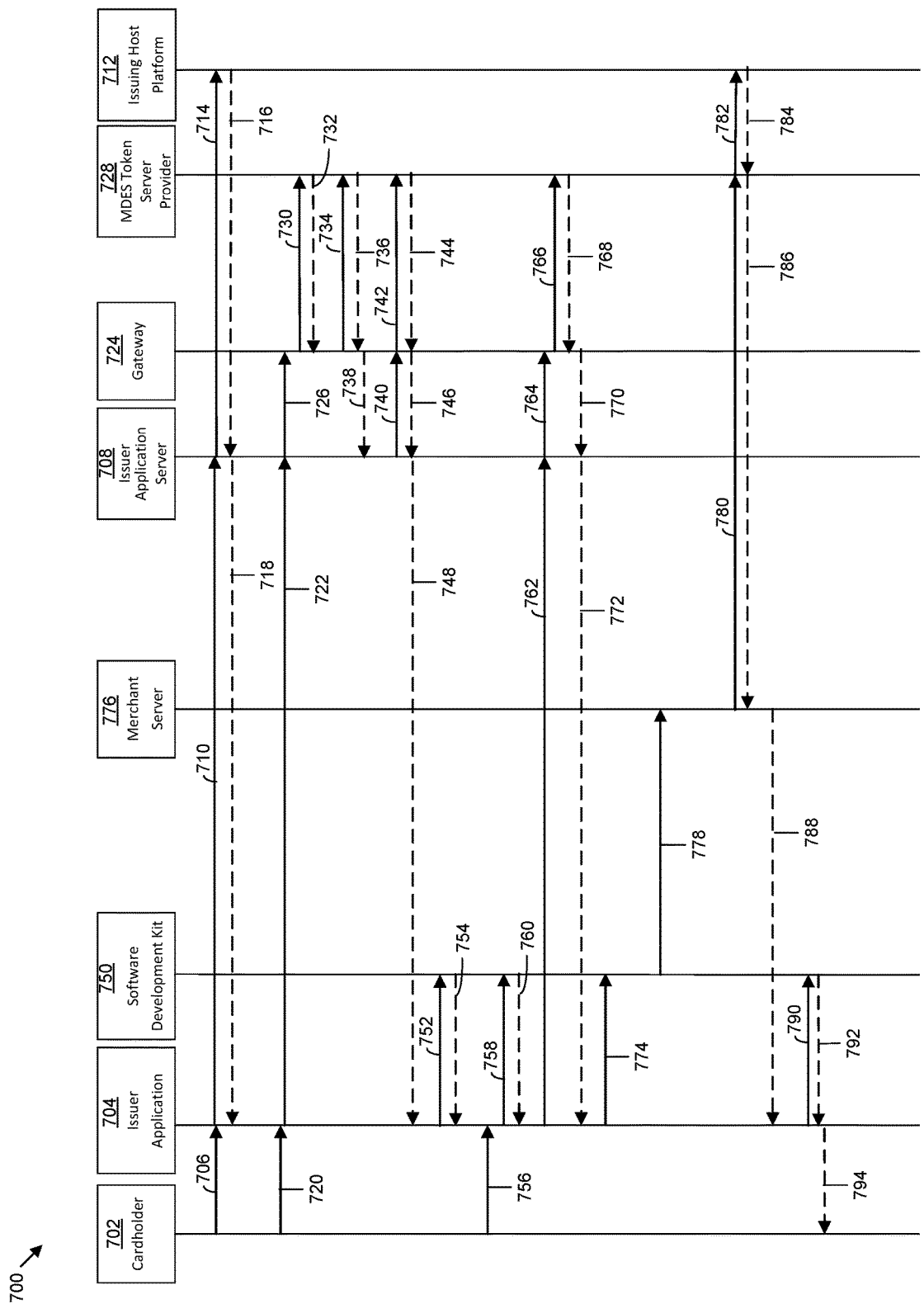
FIG. 7 illustrates an example swimlane diagram for push provisioning a payment source to a merchant using a mobile or web issuer application, in accordance with some embodiments of the present disclosure.

Turning to FIG. 7, an example swimlane diagram outlining operations of a process 700 is shown, in accordance with some embodiments of the present disclosure. The process 700 may be used for push provisioning a payment source to a merchant using the issuer application 614. Specifically, the process 700 may be used to push provision the payment source to the merchant such that the merchant may obtain a token from a token service provider, and particularly, an MDES token service provider. To push provision a payment source to a merchant, a user (e.g., cardholder 702) logs into an issuer application 704 at operation 706. The issuer application 704 is analogous to the issuer application 614 and may be a mobile application or a web application. The issuer application 704 may be accessed on a client device (e.g., the client device 602) of the cardholder 702. In some embodiments, the cardholder 702 may log into the issuer application 704 by entering authentication information such as a username, password, account number, biometrics, and/ or in any other suitable way. The issuer application 704 sends the authentication information (e.g., via a network) to an issuer application server 708 at operation 710.

The issuer application server 708, which may be considered analogous to the issuer application server 608, may authenticate the cardholder by verifying the authentication information. In some embodiments, the issuer application server 708 may obtain data from an issuing host platform 712 to authenticate the cardholder 702. The issuing host platform 712 is analogous to the issuing host platform 622. Upon authenticating the cardholder 702, the issuer application server 708 requests, from the issuing host platform 712, a list of payment sources (e.g., list of cards, list of accounts, etc.) issued by the issuer to the cardholder at operation 714.

In some embodiments, the payment sources may include credit cards. In other embodiments, the payment sources may include debit cards or any other form of payment mechanism that the cardholder may use to make payments. In some embodiments, the issuer application server 708 may also send the authentication information and/or other cardholder details to the issuing host platform 712 to enable the issuing host platform to retrieve the list of payment sources. The issuing host platform 712 may retrieve the list of payment sources and send the list back to the issuer application server 708 at operation 716. The issuer application server 708 sends the list of payment sources to the issuer application 704 at operation 718, for display (e.g., on the client device) to the cardholder 702 in the issuer application.

To push provision a payment source to a merchant, the cardholder 702 selects a payment source from the list of payment sources displayed within the issuer application 704 at operation 720. The issuer application 704 receives the cardholder's selection of the payment source (referred to herein as the "selected payment source") at the operation 720. The issuer application 704 sends a request to the issuer application server 708 for a list of merchants at operation 722. The list of merchants may include those merchants that are eligible for receiving the selected payment source via push provisioning. Upon receiving the request from the issuer application 704, the issuer application server 708 transmits the request to a gateway 724 at operation 726. The gateway 724 may be considered analogous to the gateway 606 and may be configured to communicate with a token service provider 728. The token service provider 728 may be considered analogous to the token service provider 604.

In some embodiments, the gateway 724 may be configured to communicate with a variety of different token service providers, as discussed above. Different token service providers may adopt different communication protocols. For example, the MDES token service provider may adopt a different communication protocol than the VTS token service provider, which in turn may adopt a yet another communication protocol compared to another token service provider. A communication protocol may dictate a type and/or format of messages or calls (the terms "message" and "call" are used interchangeably herein) that a particular token service provider may communicate in. The communication protocol may include other communication details or operations that are specific to a particular token service provider and that the gateway 724 needs to follow to communicate with (e.g., request information from, send information to, etc.) the particular token service provider. For example, in some embodiments, to provide the list of merchants, an MDES token service provider (e.g., the token service provider 728) may require a specific type of message (e.g., a specific type of API call) from the gateway 724 while a VTS token service provider may require a different type of message (e.g., a different API call) for providing the same list of merchants.

Thus, before establishing communication with a token service provider, the gateway 724 may first determine the type of the token service provider (e.g., MDES, VTS, etc.). In some embodiments, the gateway 724 may determine the type of the token service provider based upon the issuer. In some embodiments, the gateway 724 may determine the issuer from the information included in the request of the operation 722. For example, in some embodiments, the request may include at least some information of the selected payment source that may enable the gateway 724 to identify the issuer. In other embodiments, the gateway 724 may identify the issuer in other ways. Further, in some embodiments, the gateway 724 may maintain an issuer registration table for each issuer that the gateway is configured to interact with. The issuer registration table may indicate the type of the token service provider that the issuer is associated with. In some embodiments, the issuer registration table may also indicate the communication protocol associated with that type of the token service provider. In other embodiments, the gateway 724 may maintain another look up table to determine the communication protocol of the type of the token service provider identified from the issuer registration table. In some embodiments, the gateway 724 may, additionally or alternatively, use the cardholder's account information (e.g., PAN), issuer registration data, and/or other information to identify the type of the token service provider and/or the communication protocol associated with the identified type of the token service provider.

Therefore, the gateway 724 is configured to communicate with a variety of token service providers. To add a new token service provider, only the functionality of the gateway 724 needs to be modified to establish communication with the new token service provider. There is no need to modify the issuer application 704, the issuer application server 708, or the issuing host platform 712. There is also no need to modify the new token service provider in any way. Thus, a single gateway (e.g., the gateway 724) is configured to communicate with a variety token service providers, while hiding the complexity of communications occurring between the gateway and the token service provider 728 from the issuer application 704, the issuer application server 708, the issuing host platform 712, and the token service provider 728.

Upon determining the type of the token service provider (e.g., MDES in FIG. 7) and the communication protocol associated with the MDES token service provider, the gateway 724 sends a request for the list of merchants to the token service provider 728. In some embodiments, the gateway 724 may make an API call to the token service provider 728 to request the list of merchants. For example, in some embodiments, the gateway 724 may make a "getEligibleTokenRequestors" API call to the token service provider 728 to request the list of merchants. In other embodiments, the gateway 724 may make another type of API call to request the list of merchants. In some embodiments, the gateway 724 may use messaging protocols other than or in addition to API calls to communicate with the token service provider 728, as well as to request the list of merchants. By making the "getEligibleTokenRequestors" API call, the gateway 724 requests the list of merchants that are eligible for receiving the selected payment source via push provisioning. Upon receiving the "getEligibleTokenRequestors" API call from the gateway 724, the token service provider 728 provides the gateway with the list of merchants at operation 732.

The gateway 724, in some embodiments, may send a follow-up request to identify those merchants from the list of merchants to which the selected payment source has already been provisioned. In other words, the gateway 724 may identify those merchants that already have a token (e.g., a payment token) from the token service provider 728 for the selected payment source. In some embodiments, the gateway 724 may send a "search" API call, at operation 734, to the token service provider 728 to request the merchants that already have a token. In other embodiments, the gateway 724 may use other API calls or other messaging protocols to make the request. In some embodiments, the gateway 724 may combine the "getEligibleTokenRequestors" and the "search" API calls into a single API call.

At operation 736, the token service provider 728 sends the list of merchants back to the gateway 724 that already have a token for the selected payment source from the token service provider. The gateway 724 thus receives a first list of merchants (e.g., via the "getEligibleTokenRequestors" API call) at the operation 732 including all merchants that are eligible for push provisioning the selected payment source and a second list of merchants (e.g., via the "search" API call) at the operation 736 including those merchants that already have a token for the selected payment source. The gateway 724 may then combine the first list of merchants and the second list of merchants to generate a third list of merchants. For example, in some embodiments, the gateway 724 may create the third list of merchants that includes all of those merchants that are included in the first list of merchants. Further, for the merchants that are included in the second list of merchants, the gateway 724 may include a notification or indication in the third list of merchants indicating that the selected payment source has already been provisioned for those merchants. For example, if the first list of merchants includes merchants A, B, and C, and the second list of merchants includes merchant B, the third list of merchants may include merchants A, B, and C, with an indication against merchant B indicating that merchant B already has a token. This way, the cardholder 702 may easily identify which merchants currently do not have a token for the selected payment source.

The gateway 724 sends the third list of merchants to the issuer application server 708 at operation 738. In some embodiments, the gateway 724 may also send the first list of merchants and/or the second list of merchants to the issuer application server 708. In some embodiments, the gateway 724 and/or the token service provider 728 may associate an asset identifier with each merchant in the third list of merchants. In some embodiments, the "asset identifier" may be a unique identifier associated with a particular merchant to identify that merchant. In some embodiments, if the token service provider 728 returns a merchant that does not have an asset identifier associated therewith, the gateway 724 and/or the token service provider 728 may assign a new asset identifier to the new merchant. In other embodiments, the gateway 724 may include other or additional types of information for one or more merchants in the third list of merchants. For each merchant in the third list of merchants, the issuer application server 708 may determine a logo, button image, or other identifying indicia (e.g., web address, etc.) and update the third list of merchants to include the logo, button image, or the other identifying indicia. In some embodiments, the issuer application server 708 may determine that the third list of merchants includes a new merchant that the issuer application server has not seen before (and thus does not have a logo, button image, or other identifying indicia cached therefor). For example, in some embodiments, the issuer application server 708 may identify a new asset identifier in the third list of merchants.

The issuer application server 708 may send a request back to the gateway 724 at operation 740 to obtain the logo, button image, or other identifying indicia for the merchant(s) associated with the new asset identifier. In some embodiments, the issuer application server 708 may make a "Get Asset" API call to the gateway 724 to request the logo, button image, or other identifying indicia of the merchant associated with the new asset identifier(s). In some embodiments, the gateway 724 transmits the request to the token service provider 728 at operation 742. In some embodiments, if the gateway 724 has the logo, button image, or other identifying indicia information available, the gateway 724 may send that information to the issuer application server 708 without asking the token service provider 728. Upon getting the request from the gateway 724, the token service provider 728 sends the logo, button image, or other identifying indicia information for the merchant(s) associated with new asset identifier(s) to the gateway 724 at operation 744, which then forwards that information to the issuer application server 708 at operation 746. Thus, the issuer application server 708 communicates with the token service provider 728 through the gateway 724.

Upon receiving the logo, button image, or other identifying indicia information from the gateway 724, the issuer application server 708 may add that information to the third list of merchants. The issuer application server 708 then sends the third list of merchants with the logo, button image, or other identifying indicia added, to the issuer application 704 at operation 748, for display to the cardholder 702 (e.g., via the cardholder's client device). Additionally, the issuer application 704 sends initializing inputs, at operation 752, to a software development kit 750 for initiating the push provisioning operation of the selected payment source. The software development kit 750 may be considered analogous to the software development kit 616. In some embodiments, the initializing inputs may include cardholder data associated with the cardholder 702 such as the first name, last name, any nickname that the cardholder may have set in the issuer application 704, the language (e.g., English, French, etc.) associated with the cardholder, country where the cardholder resides, billing address, and any other information that may be considered useful or desirable to have. The software development kit 750 acknowledges the receipt of initializing inputs by sending a reply to the issuer application 704 at operation 754. In some embodiments, the reply 754 may be a "success" output indicating that the software development kit 750 has received the initializing inputs successfully or a "failure" output indicating that the software development kit has not received some or all of the initializing inputs successfully. If the software development kit 750 sends a "failure" reply, the issuer mobile application 704 may send the initializing inputs again to the software development kit. In some embodiments, the software development kit 750 may perform setback checking, syntax checking, and/or other types of authentication to ensure the validity of the initializing inputs.

The issuer application 704 also receives a selection of a merchant (referred to herein as a selected merchant) from the cardholder 702 from the third list of merchants presented to the cardholder at operation 756. Although the operation 756 is shown as occurring after the operations 752 and 754, in some embodiments, the operations 756 may occur before or along with the operations 752/754. In some embodiments, the issuer application 704 may also receive, along with the selected merchant, the asset identifier associated with the selected merchant and/or any other information associated with the selected merchant at the operation 756. In some embodiments, the merchants that have the selected payment source already provisioned may be disabled in the third list of merchants displayed to the cardholder 702 to prevent the cardholder from selecting those merchants. In other embodiments, those merchants may not be disabled, but the issuer mobile application 704 may display a notification indicating that the selected payment source is already provisioned with those merchants if the cardholder selects one of those merchants.

Upon receiving the selected merchant, the issuer application 704 passes the selected merchant, the asset identifier, and any other information associated with the selected merchant to the software development kit 750 at operation 758. The software development kit 750 may prepare a data package, referred to herein as pass-through data, to send to the issuer application 704. The pass-through data may also include the cardholder information received at the operation 752 as part of the initializing inputs, the device information (e.g., mobile number) of the mobile device of the cardholder 702 on which the issuer application 704 is accessed, the selected payment source, the selected merchant (and the associated asset identifier), any other merchant information (e.g., link to merchant's application—whether mobile or web), the PAN associated with the selected payment source, the expiration month and/or year of the selected payment source, the as well as any other information that may be needed or considered desirable in push provisioning the payment source to the selected merchant.

The software development kit 750 transmits the pass-through data to the issuer application 704 at operation 760. The issuer mobile application 704 transmits that pass-through data to the issuer application server 708 at operation 762. The issuer application server 708 makes a push provisioning request at operation 764 with the gateway 724. The push provisioning request may include the pass-through data. The gateway 724 forwards the push provisioning request, including the pass-through data, to the token service provider 728 at operation 766 via a "pushAccount" API call. In some embodiments, the gateway 724 may compile (e.g., sort, filter, arrange, etc.) the pass-through data to obtain push-account data. The push-account data may include data that the token service provider 728 needs to push provision the selected payment source with the selected merchant (e.g., to create a token for the merchant). The push-account data and the "pushAccount" API call may be in a format that the token service provider 728 understands. Upon receiving the "pushAccount" API call, the token service provider 728 may generate a receipt identifier. The receipt identifier may assume any configuration and size. In some embodiments, the receipt identifier may include numbers, letters, special characters, or a combination thereof. The receipt identifier may serve as an acknowledgment that the token service provider 728 has received the "pushAccount" API call (and the associated push-account data).

The receipt identifier is sent from the token service provider 728 to the gateway 724 at operation 768, from the gateway to the issuer server application 708 at operation 770, and from the issuer application server to the issuer application 704 at operation 772. The issuer application 704 forwards the receipt identifier to the software development kit 750 at operation 774. The software development kit 750 sends the receipt identifier to a merchant server 776 at operation 778. The merchant server 776 may be considered analogous to the merchant server 618. To send the receipt identifier to the merchant server 776, in some embodiments, the software development kit 750 may redirect the cardholder 702 from the issuer application 704 to a merchant application (whether mobile application or web application) on the client device of the cardholder through which the process 700 is being performed. The merchant application may be considered analogous to the merchant application 612. The merchant application may be associated with the merchant server 776. In some embodiments, to redirect the cardholder 702 to the merchant application (and therefore to the merchant server 776), the software development kit 750 may use a uniform resource identifier (URI) such as a Uniform Resource Locator, etc. In some embodiments, the software development kit 750 may also include a call back URI along with the receipt identifier at the operation 778.

The call back URI may be a URI (e.g., the Uniform Resource Locator) associated with the issuer application 704 to allow the merchant server 776 to send a response back to the issuer application (e.g., redirect back to the issuer application from the merchant application).

Thus, at the operation 778, the merchant server 776 receives the receipt identifier and the call back URI from the software development kit 750. In other embodiments, the software development kit 750 may send other or additional information to the merchant server 776. The merchant server 776 does not receive the cardholder data (e.g., the initializing inputs), the pass-through data, the push-account data, etc., thereby maintaining the security and integrity of that data. In some embodiments, the cardholder 702 may be required to sign in or log into the cardholder account on the merchant application to which the redirecting has occurred. In some embodiments, the cardholder 702 may be required to download the merchant application if the mobile device does not already have the merchant application installed thereon or the redirecting may occur to the web application of the selected merchant.

The merchant server 776 then sends the receipt identifier to the token service provider 728 along with a tokenize provision request at operation 780. By way of the tokenize provision request, the merchant server 776 requests a token from the token service provider 728 for the selected payment source associated with the receipt identifier. The token service provider 728 receives the receipt identifier from the merchant server 776 and compares the receipt identifier with the receipt identifier generated at the operations 766 and 768 for verification. If there is a match, the token service provider 728 generates a token for the selected payment source. The token service provider 712 also notifies the issuing host platform 712 of the generation of the token at operation 782. In some embodiments, the token service provider 728 may also include the token to the issuing host platform 712. The issuing host platform 712 may make a record of the token and associate the token with the selected payment source and the selected merchant. At operation 784, the issuing host platform 712 sends an acknowledgment to the token service provider 728. Upon receiving the acknowledgment, the token service provider 728 sends the token to the merchant server 776 at operation 786, which then redirects back to the issuer application 704 at operation 788. The merchant server 776 may also store the received token and make the token available to the cardholder 702 in the merchant application for making payments for transactions using the merchant application.

The redirection of the operation 788 may be to the call back URI that was included along with the receipt identifier at the operation 778. The redirection may include a reply message indicating a success or failure of the push provisioning process. In some embodiments, the merchant server 776 may send a success message if the merchant server 776 receives the token from the token service provider 728 successfully. In some embodiments, the merchant server 776 may send a failure message if the merchant server 776 does not receive the token from the token service provider 728 for some reason. In some embodiments, the merchant server 776 may send other or additional messages to the issuer application 704. The issuer application 704 transmits the reply message to the software development kit 750 at operation 790 for interpretation. The software development kit 750 may interpret the reply message from the merchant server 776 to determine whether the merchant server 776 successfully received the token or not. For example, the software development kit 750 may associate a "success" message from the merchant server 776 as meaning that the merchant server has successfully received the token. In such cases, the software development kit 750 sends a "success" message to the issuer application 704 at operation 792, which then displays the message on the cardholder's client device at operation 794. On the other hand, if at the operation 790, the software development kit 750 receives a "failure" reply message from the issuer application 704, the software development kit may associate that message as meaning that the merchant server has not successfully received the token from the token service provider 728. In such a case, the software development kit 750 sends a "failure" message to the issuer mobile application 704 at the operation 792, which then displays the message on the cardholder's mobile device at the operation 794.

Thus, the process 700 provides an easy, reliable, and convenient mechanism to a cardholder to receive a token for a selected merchant via a mobile or web issuer application for an MDES token service provider.

Figure 8:
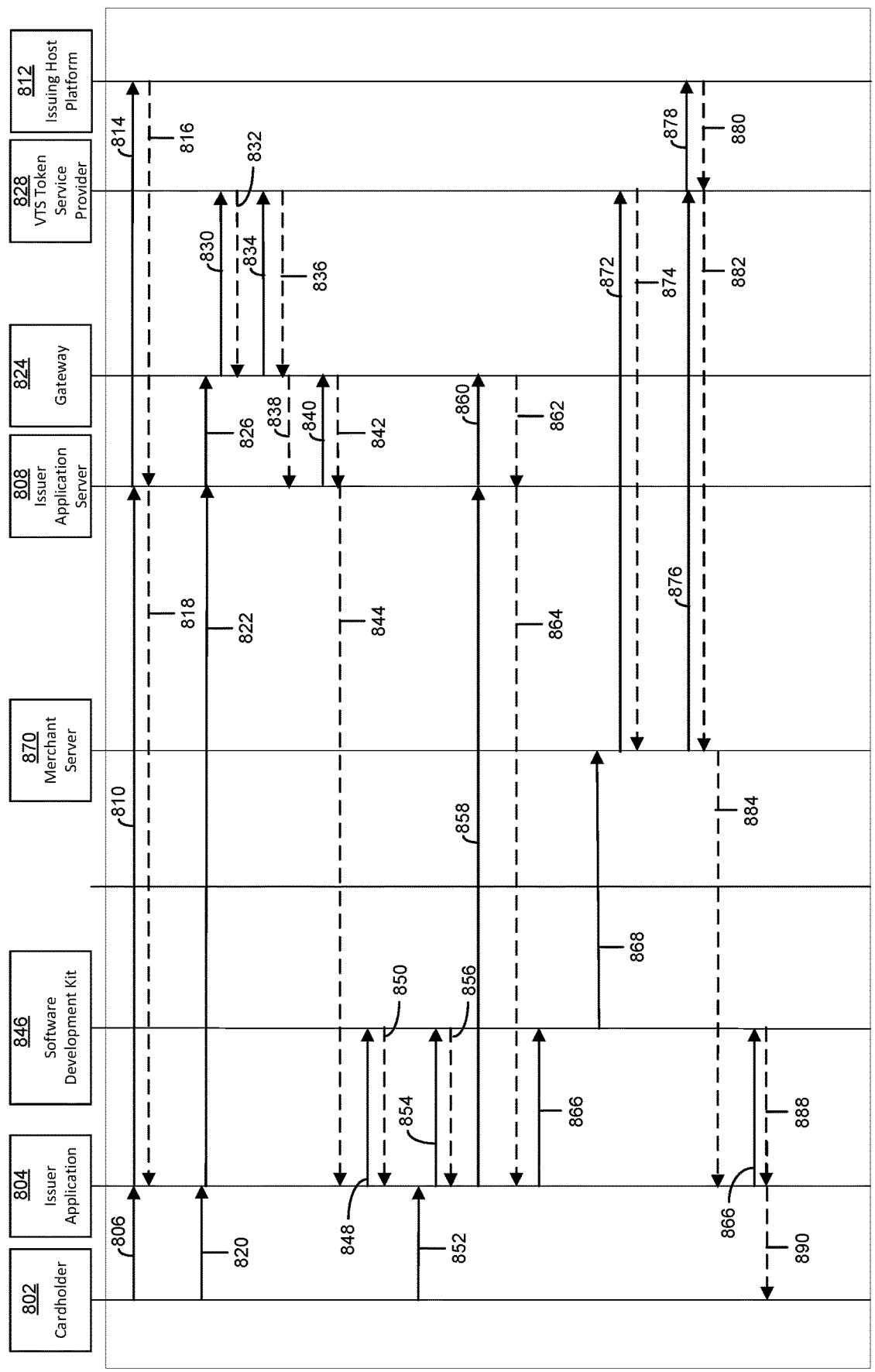
FIG. 8 illustrates another example swimlane diagram for push provisioning a payment source to a merchant using a mobile or web issuer application, in accordance with some embodiments of the present disclosure.

Turning now to FIG. 8, an example swimlane diagram outlining operations of a process 800 is shown, in accordance with some embodiments of the present disclosure. The process 800 may be used for push provisioning a payment source to a merchant. Specifically, the process 800 may be used to push provision the payment source to the merchant such that the merchant may obtain a token from a token service provider, and particularly, a VTS token service provider. To push provision a payment source to a merchant, a user (e.g., cardholder 802) logs into an issuer application 804 at operation 806. The issuer application 804 may be considered analogous to the issuer application 614 and may be either a mobile application or a web application. The issuer application 804 sends the authentication information to an issuer application server 808 at operation 810. The issuer application server 808 may be considered analogous to the issuer application server 608. The operations 806 and 810 are equivalent to the operations 706 and 710, and therefore, are not described again. The issuer application server 808 requests a list of payment sources associated with the issuer from an issuing host platform 812 at operation 814. The issuing host platform 812 may be considered analogous to the issuing host platform 622. The issuing host platform provides the list of payment sources, which are sent to the issuer application 804 via the issuer application server 808 at operations 816 and 818 for display on a client device associated with the cardholder 802. The operations 814-818 are similar to the operations 714-718, respectively.

At operation 820, the cardholder 802 selects a payment source (e.g., selected payment source) from the list of payment sources similar to the operation 720 and the selection is sent to the issuer application 804. The issuer application 804 then makes a request, at operation 822, for a list of merchants from the issuer application server 808. The issuer application server 808 sends the request to a gateway 824 at operation 826. The operations 820, 822, and 826 are equivalent to the operations 720, 722, and 726, respectively. The gateway 824 may be considered analogous to the gateway 606. The gateway 824 sends a request to a token service provider 828 for the list of merchants at operation 830. In some embodiments, the token service provider 828 may be a VTS token service provider. The token service provider 828 may be considered analogous to the token service provider 604.

As discussed above, the gateway 824 adopts the communication protocol for communication with the token service provider 828 based upon the type of the token service provider. Thus, to request the list of merchants (e.g., the first list of merchants, as discussed above) from a VTS token service provider (e.g., the token service provider 828), the gateway 824 may format messages in a form accepted by the VTS token service provider. For example, the gateway 824 may send a "retrieveNHPProfiles" API call to the token service provider 828 to request the list of merchants at the operation 830. The token service provider 828 provides the list of merchants to the gateway 824 at operation 832. In some embodiments, the token service provider 828 may include logo, button image, or other identifying information with the list of merchants. The gateway 824 then requests the list of merchants that already have a token issued for the selected payment source from the token service provider 828 at operation 834 (e.g., the second list of merchants, as discussed above). For example, the gateway 824 may send a "retreieveTokenInfo" API call to the token service provider 828 at the operation 834. At operation 836, the token service provider 828 transmits the second list of merchants to the gateway 824, which creates the third list of merchants and sends the third list of merchants to the issuer application server 808 at operation 838.

The issuer application server 808 associates each merchant on the third list of merchants with the logo, button image, or other identifying information and sends a request to the gateway at operation 840 for logo or identifier information for any new asset identifier identified in the third list of merchants, as discussed above at the operation 740. The gateway 824 may maintain a cache of logo, button image, or other identifying information of each merchant that the gateway receives from the token service provider 828 at the operation 832. In some embodiments, the gateway 824 may receive the logo, button image, or other identifying information directly from the respective merchant and store that information within the cache. In some embodiments, upon receiving the request from the issuer application server 808 at the operation 840, the gateway 824 provides the requested logo, button image, or other identifying information at operation 842 to the issuer application server. In some embodiments, the gateway 824 may provide the logo, button image, or other identifying information to the issuer application server 808 at the operation 838 when providing the third list of merchants.

The issuer application server 808 transmits the third list of merchants having the logo, button image, or other identifying information therein to the issuer application 804 at operation 844, similar to the operation 748. The issuer application 804 displays the third list of merchants on the client device of the cardholder 802. The issuer application 804 also sends the initializing inputs to a software development kit 846 at operation 848. The software development kit 846 is analogous to the software development kit 616. The software development kit 846 acknowledges the receipt of the initializing inputs at operation 850. The operations 848 and 850 are equivalent to the operations 752 and 754, respectively. The issuer application 804 also receives the selected merchant from the cardholder 802 at operation 852, similar to the operation 756. The issuer application 804 then passes the selected merchant to the software development kit 846 at operation 854 similar to the operation 758. The software development kit 846 prepares the pass-through data and sends that pass-through data to the issuer application 808 at operation 856 similar to the operation 760. The issuer application 808 sends the pass-through data to the issuer application server 808 at operation 858 and the issuer application server makes a push provision request at operation 860 to the gateway 824. The operations 858 and 860 are similar to the operations 762 and 764, respectively.

The gateway 824 receives the pass-through data and prepares an encrypted payload by encrypting the pass-through data. The gateway 824 encrypts the pass-through data as discussed above. The gateway 824 sends the encrypted payload back to the issuer application server 808 at operation 862, which then sends the encrypted payload to the issuer application 804 at operation 864. Thus, instead of sending the receipt identifier as in FIG. 7 with the MDES token service provider, the gateway 824 sends the encrypted payload to the issuer application 804. The issuer application 804 then passes the encrypted payload to the software development kit 846 at operation 866. Since the issuer application 804 is simply transferring the encrypted payload (as in FIG. 8) or the receipt identifier (as in FIG. 7) to the software development kit 846, the complexity of different communication protocols associated with different token service providers may be hidden from the issuer application. Further, any time a new token service provider is associated with the issuer, the issuer application 804 does not need to be updated. At operation 868, the software development kit 846 redirects the cardholder 802 from the issuer application 804 to a merchant server 870. The merchant server 870 may be considered analogous to the merchant server 618. The software development kit 846 may also send the encrypted payload to the merchant server 870 as part of the redirection.

The merchant server 870 transfers the encrypted payload to the token service provider 828 at operation 872 and request validation of the encrypted payload. The token service provider 828 may decrypt the encrypted payload, as discussed above, using a key to verify the authenticity of the encrypted payload. If the token service provider 828 is able to decrypt the encrypted payload, the token service provider 828 confirms validation of the encrypted payload at operation 874. Upon receiving the confirmation, the merchant server 870 makes a "provisionedToken" API call to the token service provider 828 to request a token for the selected payment source included in the encrypted payload at operation 876. The token service provider 828 generates a token for the selected payment source and sends the token to the merchant server 870 and the issuing host platform 812 at operations 878, 880, 882 similar to the operations 782, 784, and 786, respectively. The merchant server 870 then redirects back to the issuer application 804 at the callback URI and sends a reply message to the issuer application at operation 884. The reply message may be similar to the message described above at the operation 788. The issuer application 804 sends the reply message to the software development kit 846 at operation 886, which then interprets the reply message and sends the interpretation result back to the issuer application 804 at operation 888 for display to the cardholder on the client device at operation 890. The operations 886-890 are similar to the operations 790-794, respectively.

Figure 9A:
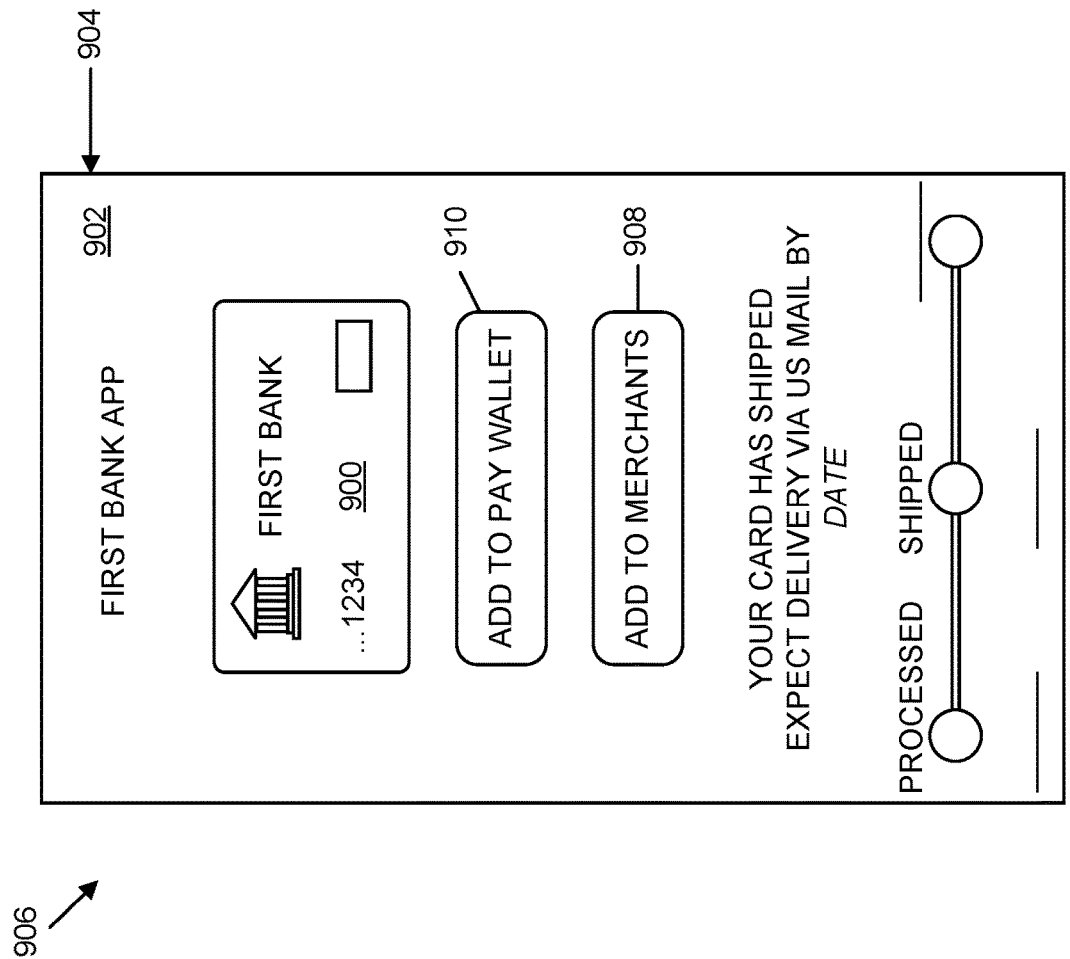
FIGS. 9A-9E illustrate example interfaces of a client device for push provisioning a payment source to a merchant, in accordance with some embodiments of the present disclosure.

Referring now to FIGS. 9A-9E, example interfaces of push provisioning a payment source to a merchant is shown, in accordance with some embodiments of the present disclosure. It is to be understood that the shape, size, configuration, orientation, information, etc. of the various features shown in FIGS. 9A-9E are only examples and not intended to be limiting in any way. Similarly, the names, logos, and other information of merchants shown in the list of merchants in FIGS. 9A-9E are only an illustrative example and not intended to be limiting (e.g., not intended to be the actual or only list of merchants who can receive a payment source via push provisioning). The number of merchants shown in the list are also only an example. Referring to FIG. 9A, to push provision a payment source 900 to a merchant, the cardholder associated with the payment source may log into an issuer application 902 associated with the payment source. For example, if the payment source 900 is issued by First Bank, the cardholder may log into the First Bank application on a client device 904. The issuer application 902 may be analogous to the issuer application 614 and the client device 904 may be analogous to the client device 602. The issuer application 902 may be either a mobile application or a web application. User interface 906 of the client device 904 shown in FIG. 9A may correspond to the operation 720 or 820. To push provision the payment source 900 to a merchant, the cardholder may select an "add to merchants" option 908. The user may also select to push provision the payment source 900 to a pay wallet, as discussed above and further discussed below, by selecting an "add to pay wallet" option 910.

Figure 9B:
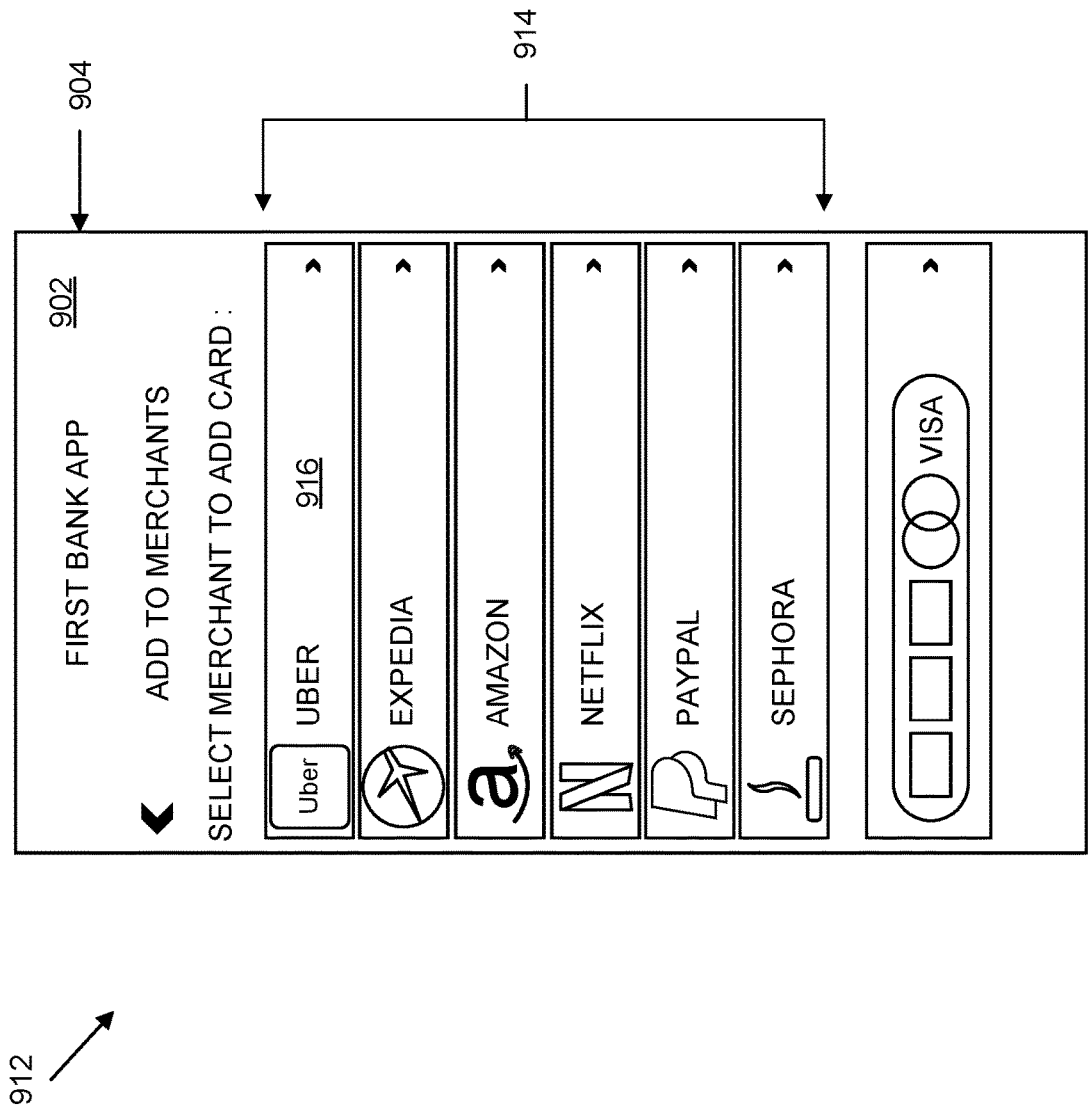
Figure 9C:
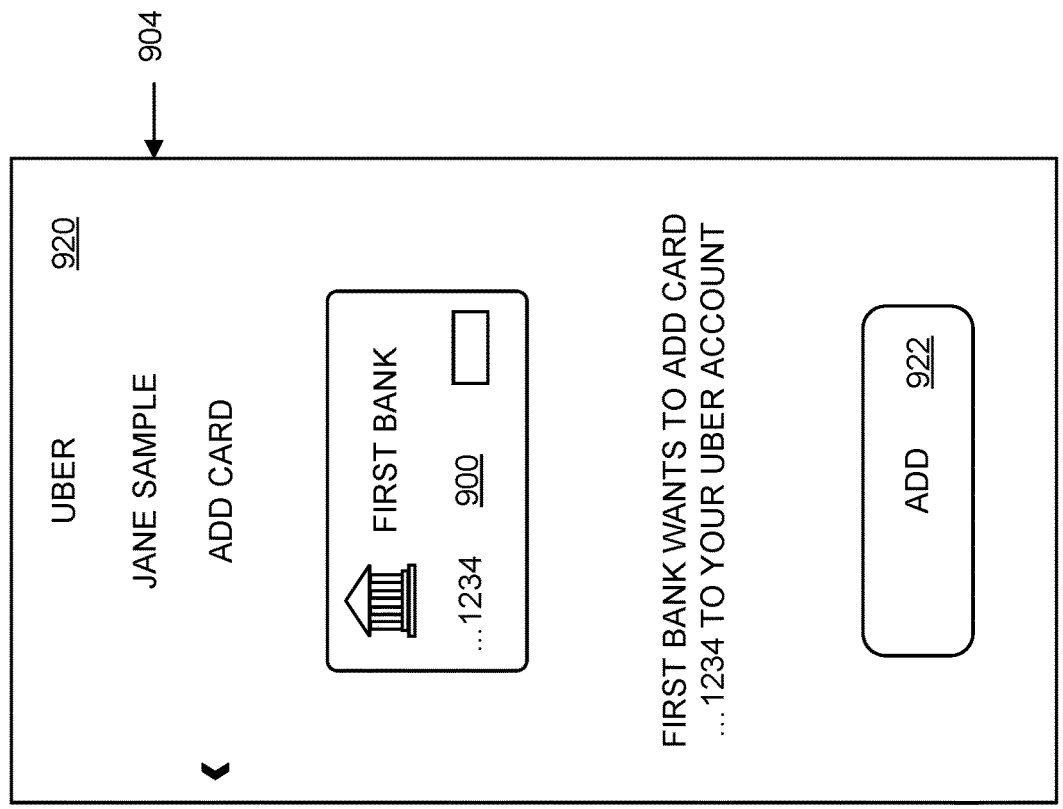
Figure 9D:
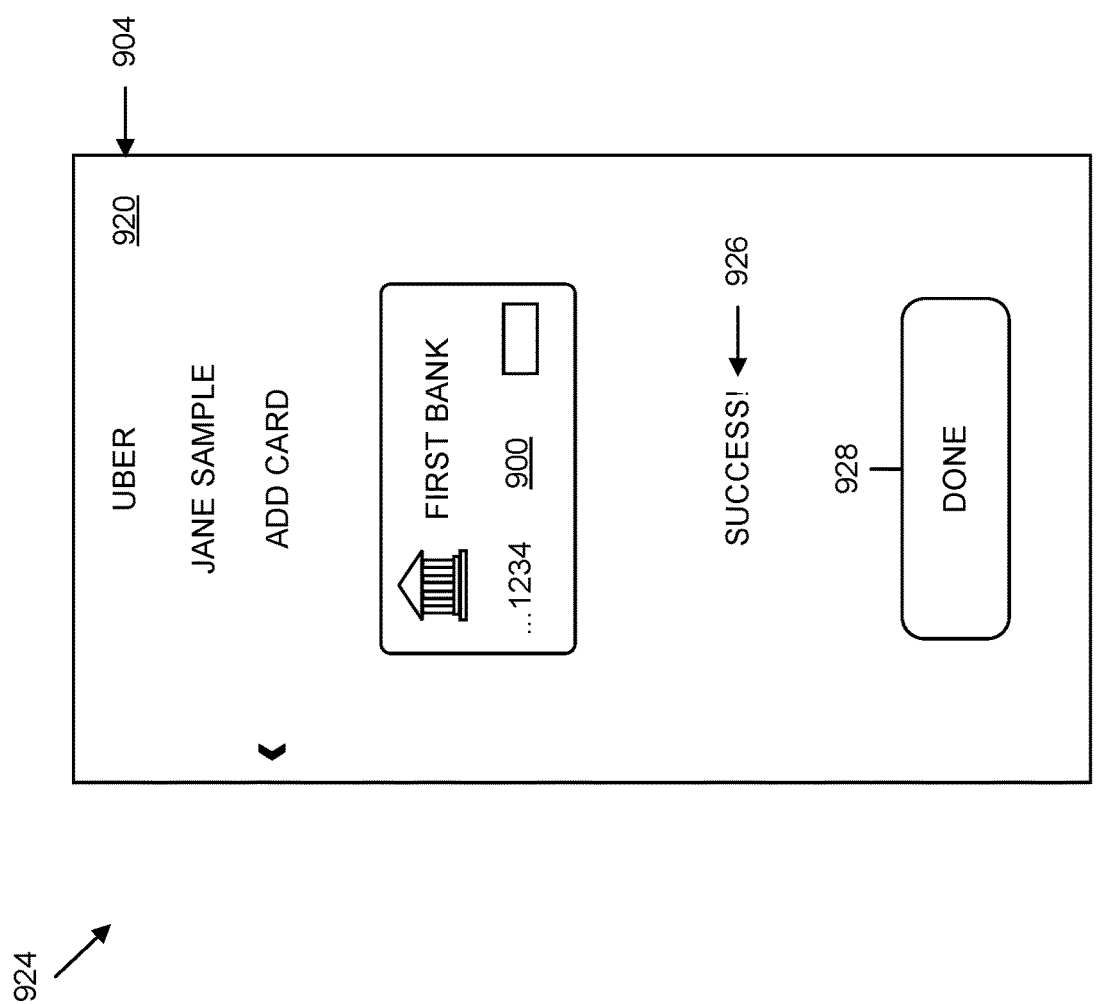
Figure 9E:
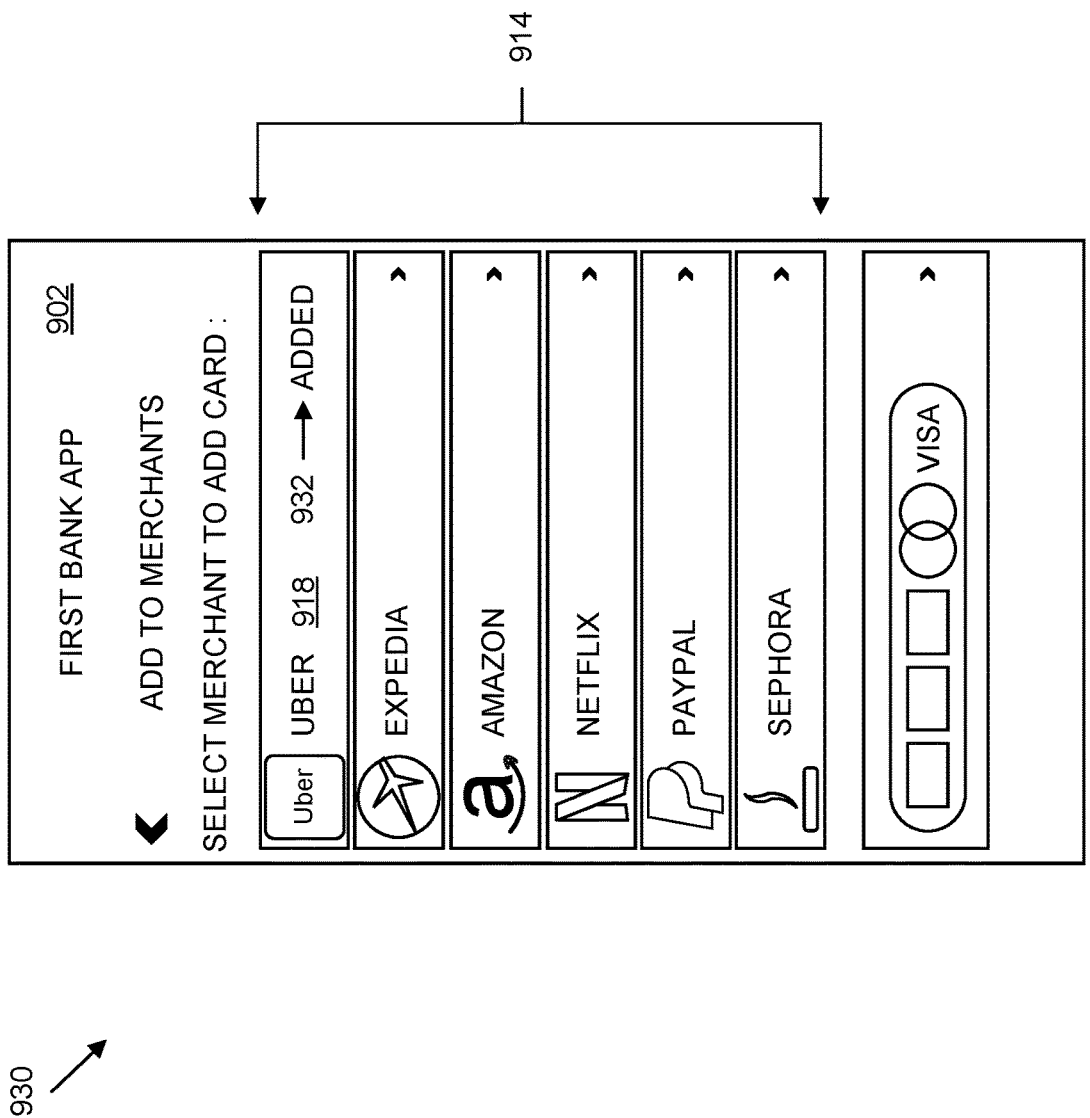

Upon selecting the "add to merchants" option 908, a user interface 912 of FIG. 9B may be presented in the issuer application 902. The user interface 912 may present a list of merchants 914, as obtained in the operations 722-748 or the operations 822-844. The cardholder may select a merchant 916 for push provisioning the payment source 900 to. Upon selecting the merchant 916, a user interface 918 of FIG. 9C on the client device 904 may be presented. The user interface 918 may correspond to the redirecting to the merchant server 776 in the operation 778 or to the merchant server 870 in the operation 868. Thus, the user interface 918 opens a merchant application 920 associated with the merchant 916 that the cardholder selected in FIG. 9B. In some embodiments, the merchant application 920 may require the cardholder to log in. In other embodiments, the merchant application 920 may automatically log the cardholder into the merchant application.

The merchant application 920 may display the payment source 900 that the cardholder is attempting to push provision to the merchant 916. The cardholder may confirm the push provisioning operation by clicking on an add button 922. When the cardholder clicks the add button 922, the operations 780-786 or the operations 872-882 may be performed in the background. Upon clicking the add button 922, the cardholder may be directed to a user interface 924 of FIG. 9D. The user interface 924 may indicate whether the push provisioning operation is successful. For example, the user interface 924 may indicate a message 926 in the merchant application 920. The cardholder may confirm completion of the push provisioning operation by clicking on a done button 928. Upon clicking on the done button 928, the operations 788-794 or the operations 884-890 may be performed. Specifically, the cardholder may be redirected back to the issuer application 902, as shown in user interface 930 of FIG. 9E.

The user interface 930 may show the list of merchants 914, including the merchant 916 that the user just push provisioned the payment source 900 too. The merchant 916 may be associated with a notification 932 indicating that the payment source 900 has been push provisioned to the merchant 916. Thus, the cardholder may easily and conveniently push provision a payment source to a merchant without needing to wait for a physical copy of the payment source while hiding all the background complexity associated with varying communication protocols of various token service providers by virtue of using the software development kit 750/the gateway 724 and the software development kit 846/the gateway 824.

Figure 10:
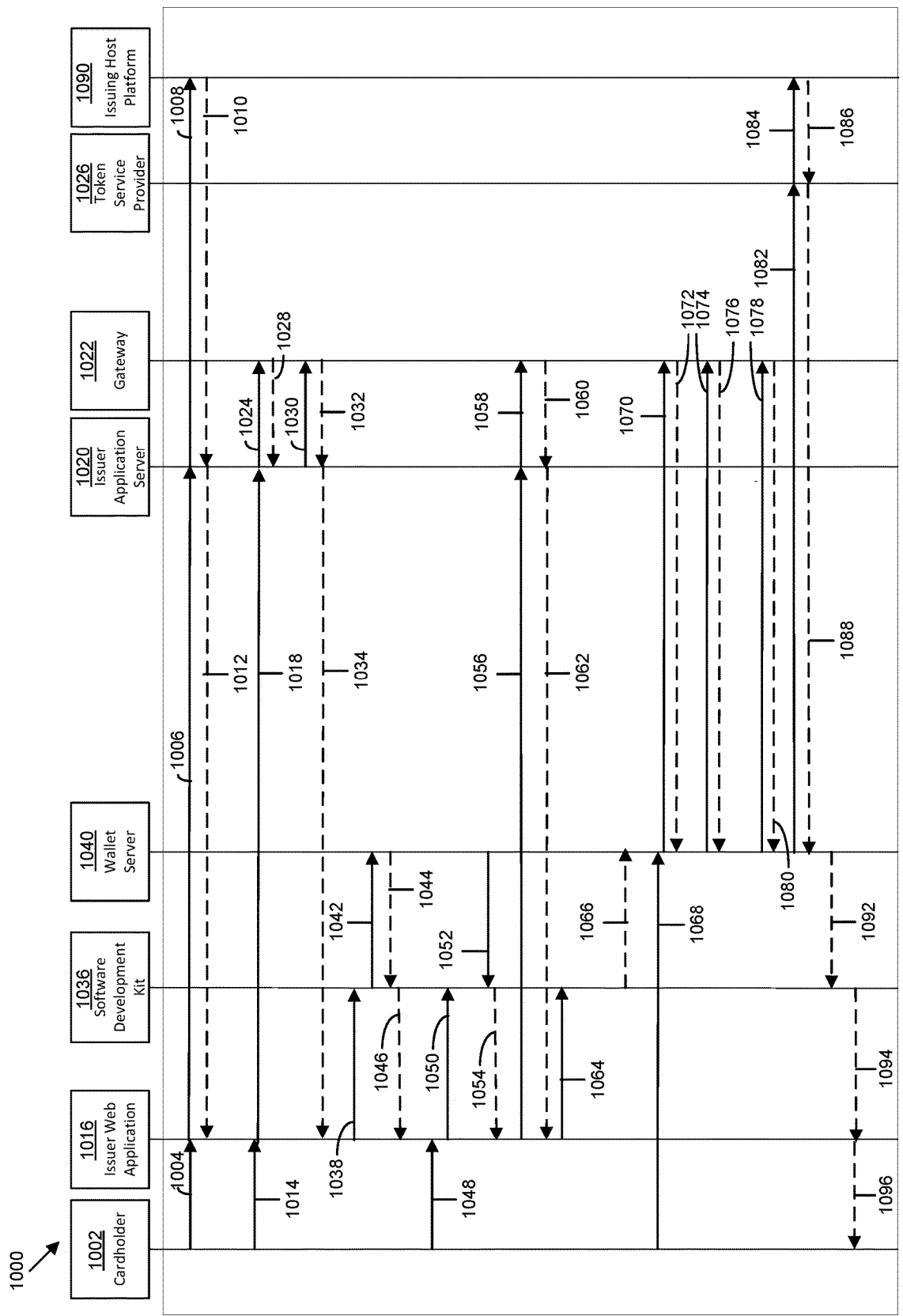
FIG. 10 illustrates an example swimlane diagram for push provisioning a payment source to Apple Pay® wallet using a web issuer application, in accordance with some embodiments of the present disclosure.

Referring to FIG. 10, an example swimlane diagram outlining operations of a process 1000 is shown, in accordance with some embodiments of the present disclosure. The process 1000 may be used for push provisioning a payment source to a pay wallet, and particularly to an Apple Pay® wallet, using a web application of the issuer application 614. The process 1000 starts with a cardholder 1002 selecting a payment source at operations 1004-1014 similar to the operations 706-720, respectively. Upon receiving the selected payment source at the operation 1014, an issuer web application 1016 requests a list of pay wallets, at operation 1018, from an issuer application server 1020. The issuer web application 1016 may be considered analogous to the issuer application 614 and the issuer application server 1020 may be considered analogous to the issuer application server 608. The issuer application server 1020 forwards the request to a gateway 1022 at operation 1024 similar to the operation 726. The gateway 1022 may be considered analogous to the gateway 606.

In some embodiments, the gateway 1022 may prepare the list of pay wallets. In some embodiments, since there are a limited number of pay wallets, the gateway 1022 may maintain all the data needed to prepare the list of pay wallets without needing to request that data from a token service provider. In other embodiments, the gateway 1022 may request the list of pay wallets from a token service provider 1026 similar to the operations 730-736 for an MDES token service provider or the operations 830-836 for a VTS token service provider. The token service provider 1026 may be considered analogous to the token service provider 604. The gateway 1022 returns the list of pay wallets to the issuer application server 1020 at operation 1028. In response, the gateway 1022 receives a request from the issuer application server 1020 at operation 1030 for the logo, button image, or other identifying information for each pay wallet that the issuer application server 1020 does not have the logo, button image, or other identifying information for. The operation 1030 is similar to the operation 840. In some embodiments, the gateway 1022 may maintain the logo, button image, or other identifying information for each pay wallet. In such cases, the gateway may retrieve the logo, button image, or other identifying information and send it back to the issuer application server 1020 at operation 1032 similar to the operation 842. In other embodiments, the gateway 1022 may request the logo, button image, or other identifying information from the token service provider 1026 similar to the operations 734 and 736.

In some embodiments, the gateway 1022 may also indicate which pay wallets already have tokens for the selected payment source. The issuer application server 1020 may generate a list of pay wallets (e.g., similar to the third list of merchants but with pay wallets instead of merchants) and send that list to the issuer web application 1016 at operation 1034. The issuer web application 1016, upon receiving the list of pay wallets, sends initializing inputs to a software development kit 1036 at operation 1038. The software development kit 1036 may be considered analogous to the software development kit 616. The operation 1038 is similar to the operation 752. The initializing inputs may include any inputs that may be needed to provision the selected payment source to Apple Pay® wallet. The initializing inputs may be provided (e.g., via an "initiAddToAppleWallet" call) to the browser of the issuer web application 1016 to facilitate pushing the initializing inputs to a software development kit associated with a wallet server 1040 associated with Apple Pay® wallet at operation 1042. Thus, in some embodiments, the initializing inputs may sit in a holding state in the browser of the issuer web application 1016 before sending to the wallet server 1040. At operations 1044 and 1046, the issuer web application 1016 receives a response, via the software development kit 1036, from the browser of issuer web application that the initializing inputs have been received.

At operation 1048, the cardholder 1002 selects a pay wallet, and particularly Apple Pay® wallet, for provisioning the selected payment source to. The selected pay wallet (e.g., Apple Pay® wallet) is sent to the issuer web application 1016 at the operation 1048 along with an asset identifier associated with the selected pay wallet. The issuer web application 1016 sends the selected pay wallet and the associated asset identifier to the software development kit 1036 at operation 1050. At operation 1052, the software development kit 1036 receives a Java web token (or another type of identifier) from the wallet server 1040. The Java web token may be associated with a current push provisioning session. Although the operations 1038, 1042, and 1048-1052 have been described as occurring in a specific order, in other embodiments, those operations may occur in a different order.

The software development kit 1036 passes the Java web token to the issuer web application 1016 at operation 1054, which then transmits the Java web token along with pass-through data (as discussed above) to the issuer application server 1020 at operation 1056 to make a push provisioning request. The issuer application server 1020 forwards the push provisioning request along with the Java web token and the pass-through data to the gateway 1022 at operation 1058. The gateway 1022 may temporarily store all the pass-through data, including the Java web token temporarily and acknowledge receipt at operations 1060 and 1062. The issuer web application 1016 then calls the software development kit 1036 at operation 1064 similar to the operation 774. The software development kit 1036, at operation 1066, redirects the cardholder 1002 to the web application associated with the wallet server 1040 (e.g., the Apple pay web page). The redirection may be similar to the operation 778 but to the wallet server 1040 instead of the merchant server 776. The wallet server 1040 may be similar to the pay wallet server 620. Upon being redirected to the pay wallet application associated with the wallet server 1040, the cardholder 1002 logs into the cardholder's pay wallet account at operation 1068 using, for example, their Apple identifier. Upon logging into the wallet server account, in some embodiments, the cardholder 1002 may be presented a list of Apple devices (e.g., mobile devices (e.g., iPhone), iPad, Apple TV, etc.) on which the selected payment source may be provisioned to. In some embodiments, only those Apple devices may be presented that are suitable for receiving the selected payment source.

Upon selecting an Apple device for provisioning the selected payment source to, at operation 1070, the wallet server 1040 sends the Java web token to the gateway 1022 to request a target identifier. The gateway 1022 receives the Java web token, matches the Java web token with the Java web token receives at the operation 1058, and issues a receipt identifier upon finding a match. If there is no match, the gateway 1022 may issue an error message. The gateway 1022 sends the receipt identifier back to the wallet server 1040 at operation 1072. Upon receiving the receipt identifier, in some embodiments, the wallet server 1040 may send a status message to the gateway 1022 at operation 1074 to ensure that the current push provisioning session is still active. Upon receiving a response from the gateway 1022 at operation 1076 indicating that the current push provisioning session is still active, the wallet server 1040 requests the pass-through data from the gateway at operation 1078. In some embodiments, the wallet server 1040 may also send the receipt identifier to the gateway 1022.

The gateway 1022 may retrieve the pass-through data that was stored at the operation 1058 and sends that data to the wallet server 1040 at operation 1080. The wallet server 1040 sends the pass-through data to the token service provider 1026 at operation 1082 to request a token (e.g., a payment token) for the selected payment source. The token service provider 1026 generates a token and sends the token to the wallet server at operations 1084, 1086, and 1088 via an issuing host platform 1090. The issuing host platform 1090 may be considered analogous to the issuing host platform 622. The operations 1084-1088 are similar to the operations 782-786. Upon receiving the token, the wallet server 1040 redirects back to the issuer web application 1016 and sends a reply message (e.g., success, failure, etc.) to the software development kit 1036 at operation 1092, which then interprets the message and sends a result back to the issuer web application 1016 at operation 1094 for display to the cardholder 1002 at operation 1096. The operations 1094 and 1096 are similar to the operations 792 and 794, respectively.

Figure 11:
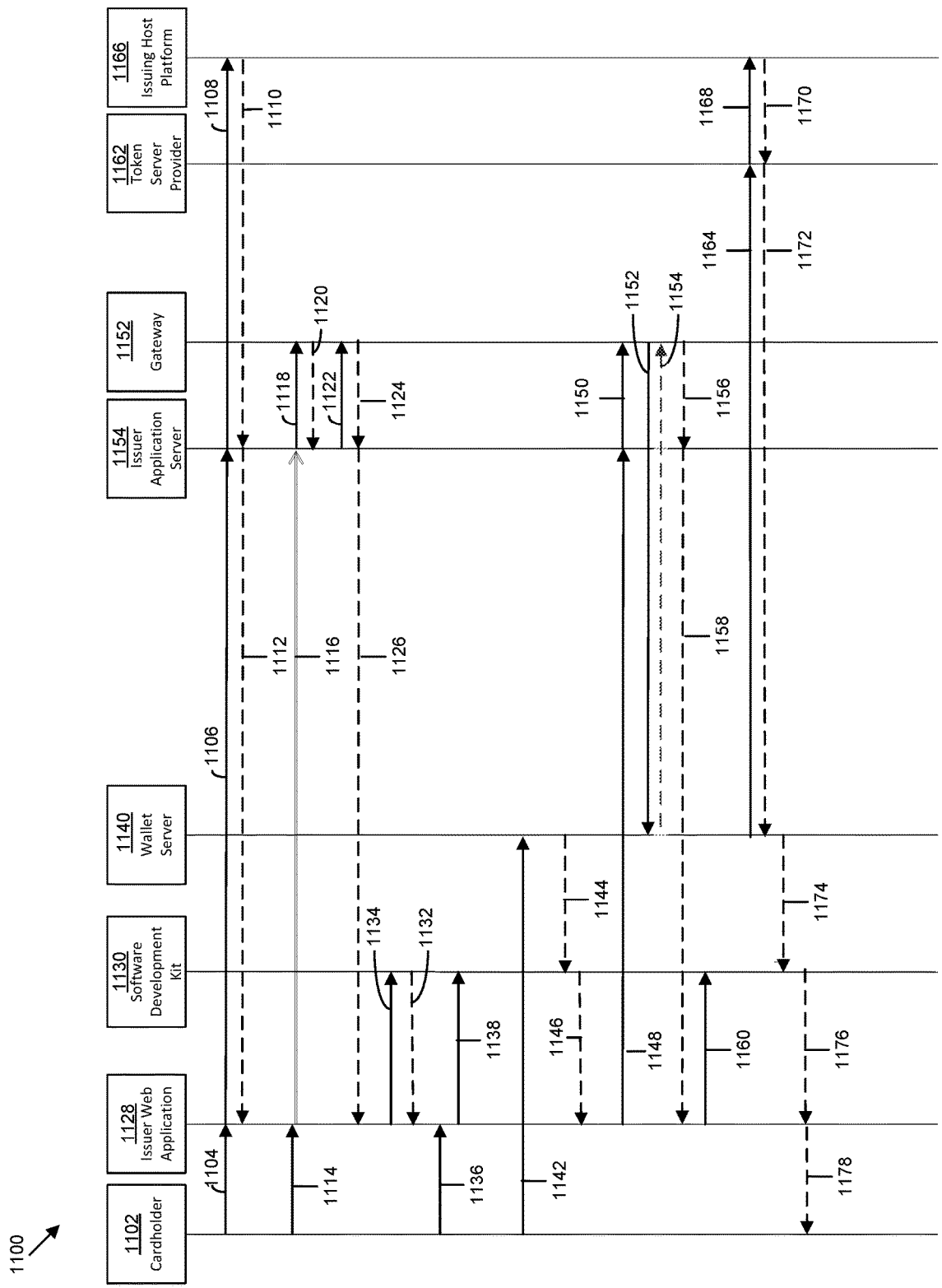
FIG. 11 illustrates an example swimlane diagram for push provisioning a payment source to Google Pay™ wallet using a web issuer application, in accordance with some embodiments of the present disclosure.

Referring to FIG. 11, an example swimlane diagram outlining operations of a process 1100 is shown, in accordance with some embodiments of the present disclosure. The process 1100 may be used for push provisioning a payment source to a pay wallet, and particularly to a Google Pay™ wallet using a web application of the issuer application 614. The process 1100 starts with a cardholder 1102 selecting a payment source at operations 1104-1114 similar to the operations 1004-1014, respectively. Upon selecting the payment source, the cardholder 1102 requests a list of pay wallets to select a pay wallet (e.g., Google Pay™ wallet) from at operations 1116-1126 similar to the operations 1018-1034, respectively. An issuer web application 1128 sends initializing inputs to a software development kit 1130 at operations 1132 and 1134 similar to the operations 758 and 760. The issuer web application 1128 may be considered analogous to the issuer application 614 and the software development kit may be considered analogous to the software development kit 616. At operation 1136, the cardholder 1102 selects a pay wallet (e.g., Google Pay™ wallet) from the list of pay wallets via the issuer web application 1128. The selected pay wallet along with the associated asset identifier is sent to the software development kit 1130 at operation 1138, which then redirects the cardholder 1102 to a web page associated with a wallet server 1140 of Google Pay™ wallet. The wallet server 1140 may be considered analogous to the pay wallet server 620.

The cardholder 1102 logs into their Google account using their Google credentials and selects a suitable Google device at operation 1142 for provisioning the selected payment source to similar to the operation 1068. Upon logging in and selecting a device, the wallet server 1140 sends a session identifier (or token) to the software development kit 1130 at operation 1144. The software development kit 1130 passes on the session identifier along with pass through data to the issuer web application 1128 at operation 1146. The issuer web application 1128 sends the pass through data along with the session identifier, at operations 1148 and 1150, to a gateway 1152 via an issuer application server 1154. The gateway 1152 may be considered analogous to the gateway 606 and the issuer application server 1154 may be considered analogous to the issuer application server 608.

The gateway 1152 encrypts the pass-through data to generate an encrypted payload similar to the operation 860 and sends the encrypted payload to the wallet server 1140 at operation 1152, which acknowledges receipt at operation 1154. In some embodiments, upon the wallet server 1140 acknowledging receipt of the encrypted payload, the gateway 1152 sends a message (without the encrypted payload) to the software development kit 1130 via the issuer web application server 1154 and the issuer web application 1128 at operations 1156-1160. The wallet server 1140 sends the encrypted payload to a token service provider 1162 for requesting a token for the selected payment source at operation 1164. The token service provider 1162 may be an MDES token service provider, a VTS token service provider, or any other token service provider similar to the token service provider 604. The token service provider 1162 generates a token and sends that token to the wallet server 1140 via an issuing host platform 1166 at operations 1168-1172, as discussed above. The wallet server 1140 generates a reply message (e.g., success, failure, etc.) indicating whether the wallet server successfully received the token or not, and sends the message to the software development kit 1130 at operation 1174. The software development kit 1130 interprets the reply message and sends an interpretation back to the issuer web application 1128 at operation 1176 (similar to the operation 1094) for display to the cardholder 1102 at operation 1178.

Figure 12:
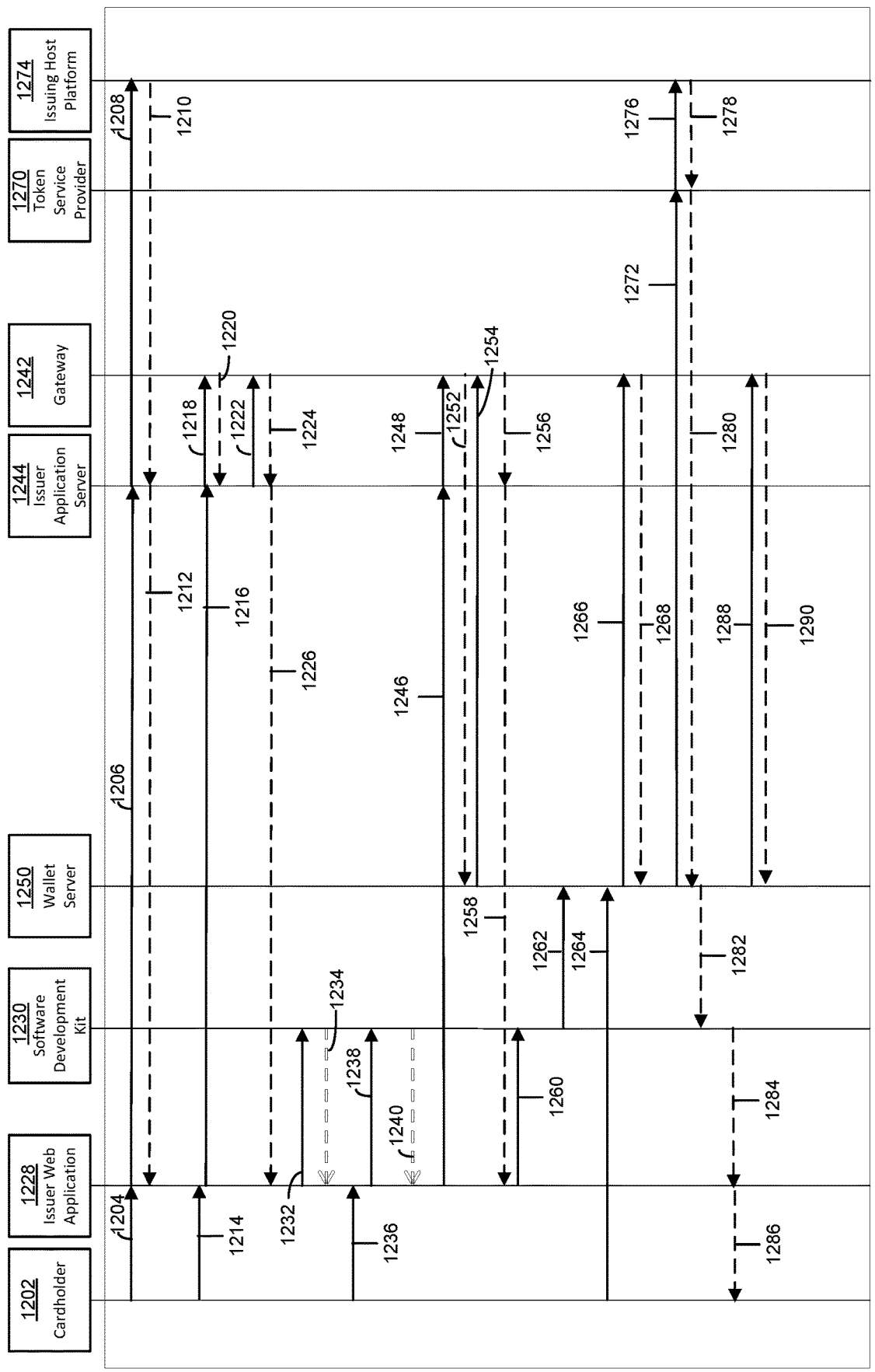
FIG. 12 illustrates an example swimlane diagram for push provisioning a payment source to Samsung Pay® wallet using a web issuer application, in accordance with some embodiments of the present disclosure.

Referring to FIG. 12, an example swimlane diagram outlining operations of a process 1200 is shown, in accordance with some embodiments of the present disclosure. The process 1200 may be used for push provisioning a payment source to a pay wallet, and particularly to a Samsung Pay® wallet, using a web application of the issuer application 614. The process 1200 starts with a cardholder 1202 selecting a payment source at operations 1204-1214 similar to the operations 1004-1014, respectively. Upon selecting the payment source, the cardholder 1202 requests a list of pay wallets to select a pay wallet (e.g., Samsung Pay® wallet) from at operations 1216-1226 similar to the operations 1018-1034, respectively. An issuer web application 1228 sends initializing inputs to a software development kit 1230 at operations 1232 and 1234 similar to the operations 1132 and 1134, respectively. The issuer web application 1228 may be considered analogous to the issuer application 614 and the software development kit 1230 may be considered analogous to the software development kit 616. At operation 1236 similar to the operation 1136, the cardholder 1102 selects a pay wallet (e.g., Samsung Pay® wallet) from the list of pay wallets via the issuer web application 1228. The selected pay wallet along with the associated asset identifier is sent to the software development kit 1230 at operation 1238 (similar to the operation 1138).

The software development kit 1230 prepares pass-through data and sends that pass-through data to the issuer web application 1228 at operation 1240, which then makes a push provisioning request to a gateway 1242 via an issuer application server 1244 at operations 1246 and 1248. The issuer application server 1244 may be considered analogous to the issuer application server 608 and the gateway 1242 may be considered analogous to the gateway 606. The gateway 1242 may hold on to the pass-through data temporarily and send a receipt identifier to a wallet server (e.g., Samsung wallet server) 1250 at operation 1252. The wallet server 1250, may be considered analogous to the pay wallet server 620, may send an acknowledgment message to the gateway at operation 1254. The gateway 1242 also sends a message to the software development kit 1230 via the issuer application server 1244 and the issuer web application 1230 at operations 1256, 1258, and 1260 indicating the start of the push provisioning process. The software development kit 1230 redirects the cardholder 1202 to a pay wallet application associated with the wallet server 1250 and sends the receipt identifier to the wallet server.

At operation 1264, upon being redirected to the pay wallet application of the wallet server 1250, the cardholder 1202 logs into their Samsung account and selects a suitable device for push provisioning the selected payment source to, similar to the operation 1068. Upon selecting a device, the wallet server 1250 sends the receipt identifier to the gateway 1242 at operation 1266. The gateway 1242 compares the receipt identifier received from the wallet server 1250 at the operation 1266 with the receipt identifier sent at the operation 1252 to determine a match. If the gateway 1242 determines that the receipt identifier received from the wallet server 1250 at the operation 1266 matches with the receipt identifier sent at the operation 1252, and that the current session is still active, the gateway retrieves the pass-through data and sends the pass-through data to the wallet server at operation 1268. In some embodiments, the gateway 1242 may encrypt the pass-through data before sending to the wallet server 1250.

The wallet server 1250 sends the pass-through data to a token service provider 1270 at operation 1272. The token service provider 1270 may be an MDES token service provider, a VTS token service provider, or any other token service provider similar to the token service provider 604. The token service provider 1270 generates a token and sends that token to the wallet server 1250 via an issuing host platform 1274 at operations 1276-1280, as discussed above. The issuing host platform 1274 may be considered analogous to the issuing host platform 622. The wallet server 1250 generates a message (e.g., success, failure, etc.) indicating whether the wallet server successfully received the token or not, and sends the message to the software development kit 1230 at operation 1282. The software development kit 1230 interprets the message and sends an interpretation back to the issuer web application 1228 at operation 1284 (similar to the operation 1094) for display to the cardholder 1202 at operation 1286. In some embodiments, the wallet server 1250 may also send a status message to the gateway 1242 at operation 1288 to indicate whether the wallet server successfully received the token or not. The gateway 1242 may send a response back at operation 1290.

Turning now to FIGS. 13A-13E, example interfaces of push provisioning a payment source to a pay wallet using an issuer's web application is shown, in accordance with some embodiments of the present disclosure. It is to be understood that the shape, size, configuration, orientation, information, etc. of the various features shown in FIGS. 13A-13E are only examples and not intended to be limiting in any way. Similarly, the names, logos, and other information shown in FIGS. 13A-13E are only an example and not intended to be limiting. Although FIGS. 13A-13E are directed to push provisioning to Apply Pay®, similar operations may be performed for Google Pay™ and Samsung Pay®.

To push provision a payment source issued by an issuer to a pay wallet, the cardholder logs into an issuer web application 1300 associated with the issuer on a client device 1302. The cardholder may access the issuer web application 1300 by opening a web browser on the client device 1302 and entering URI information (e.g., the Uniform Resource Locator (URL)) of the issuer into the web browser. For example, if the issuer is First Bank, the cardholder may enter the web address of First Bank into a web browser to be taken to First Bank's website. It is to be understood that First bank is only an example and not intended to be limiting in any way. In other embodiments, the description applies to other issuers as well. On the issuer's website, the cardholder may log into their cardholder account similar to the operation 1004. Upon successfully logging into the cardholder account on the issuer web application, the cardholder may be presented with a list of accounts 1304 of the operation 1012 in a user interface 1306 of FIG. 13A.

The cardholder may select one account from the list of accounts 1304 for push provisioning by clicking on an "add to Apple wallet" button. For example, in some embodiments, to select debit card associated with account 1308 for push provisioning, the cardholder may select button 1310. In the user face 1306, the selection of the payment source and the selection of the pay wallet occurs by way of the select button 1310. In other embodiments, the cardholder may first select a payment source (e.g., account) and then click on another button to start the push provisioning process. Upon clicking on the select button 1310 to start the push provisioning process, the cardholder may be directed to a user interface 1312 of FIG. 13B. The user interface 1312 may redirect the cardholder to a web application 1314 associated with Apple server as in the operation 1066. The cardholder may be required to log in to their Apple account and select an Apple device. Upon selecting an Apple device, the cardholder may click on a next button 1316 to open a user interface 1318 of FIG. 13C. The user interface 1318 may present terms and conditions to the cardholder to accept. The cardholder may accept the terms and conditions by clicking on an agree button 1320. In other embodiments, the cardholder may be presented other or additional user interfaces.

Figure 13B:
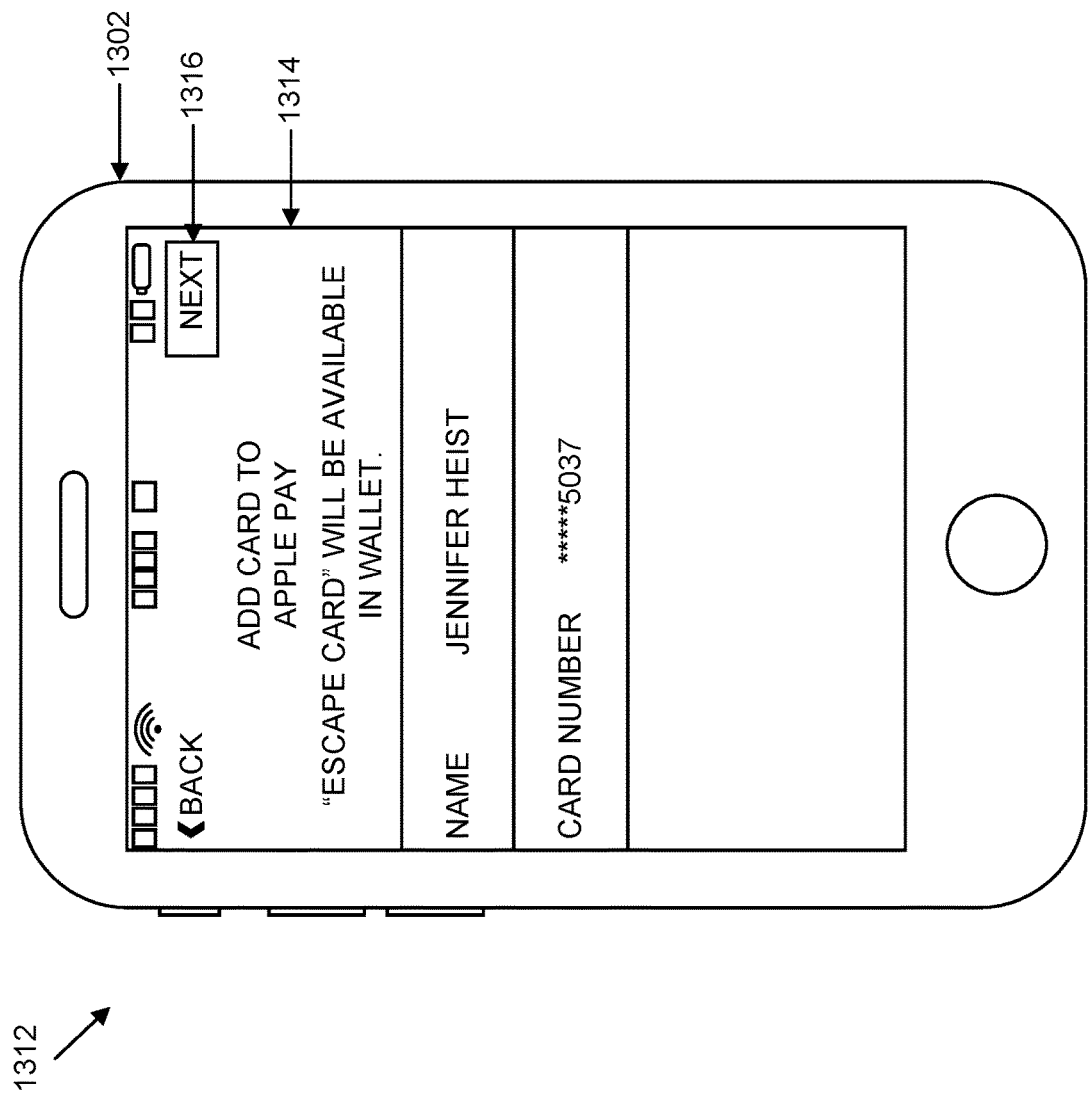
Figure 13C:
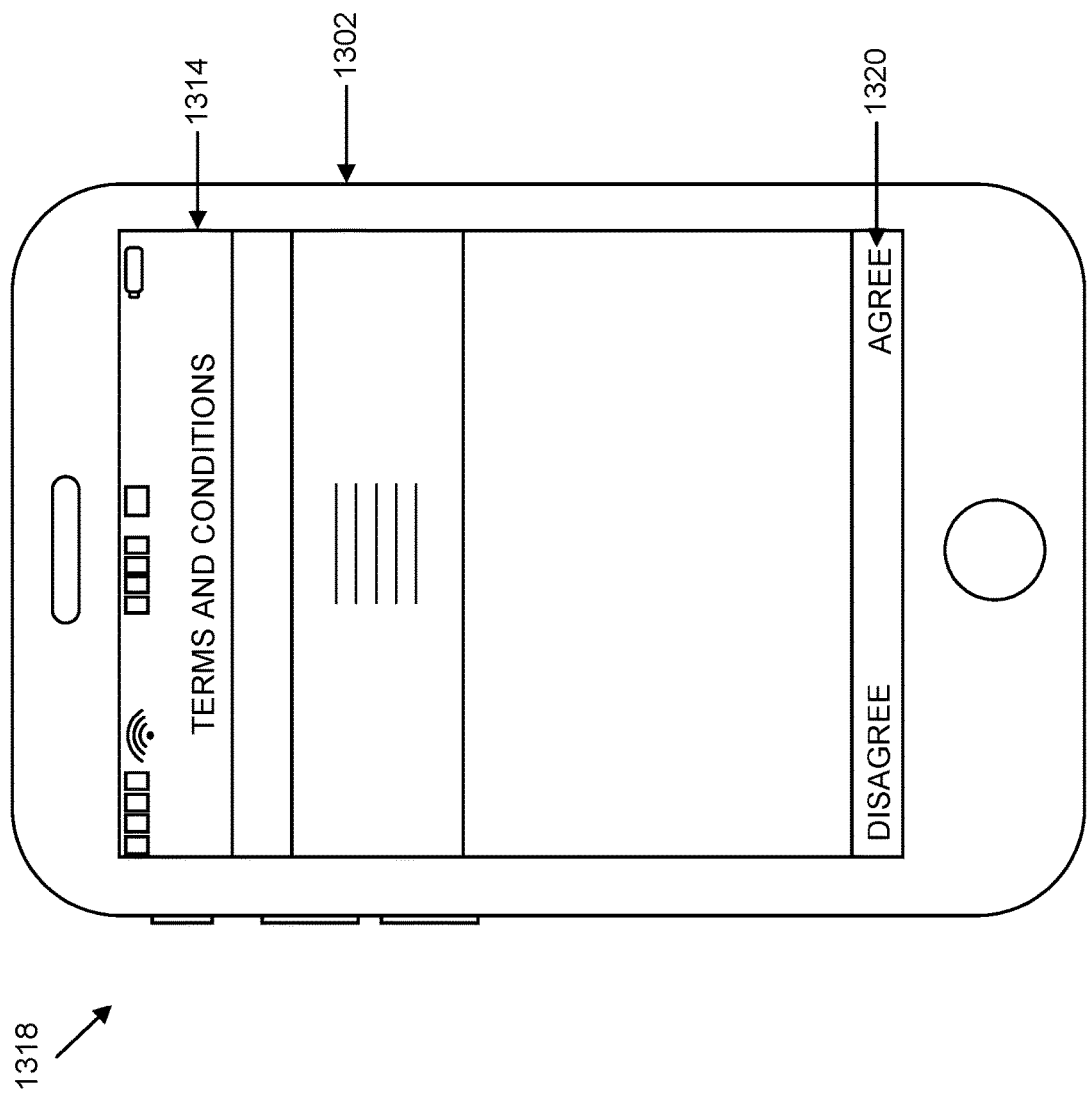
Figure 13D:
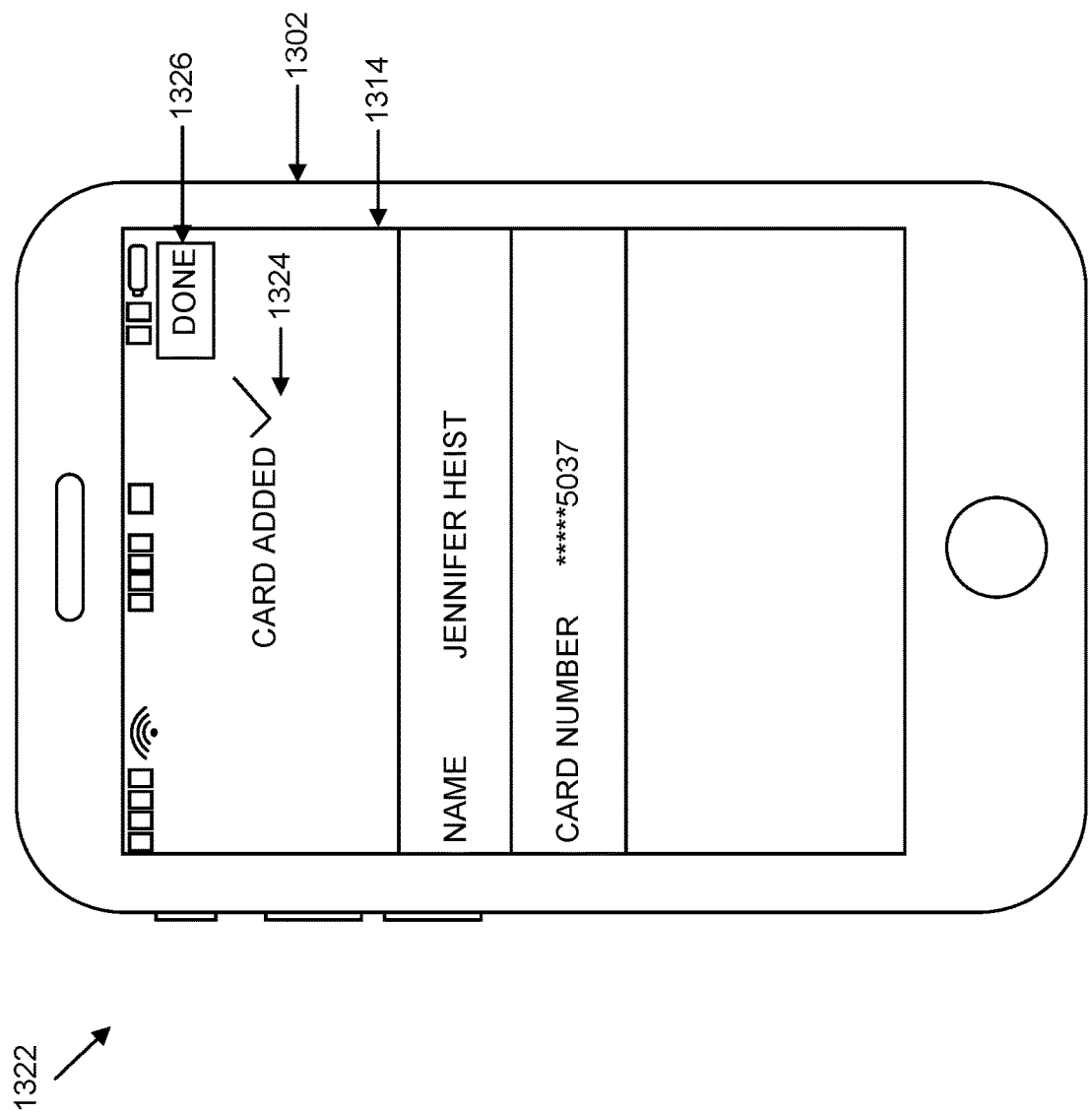
Figure 13E:
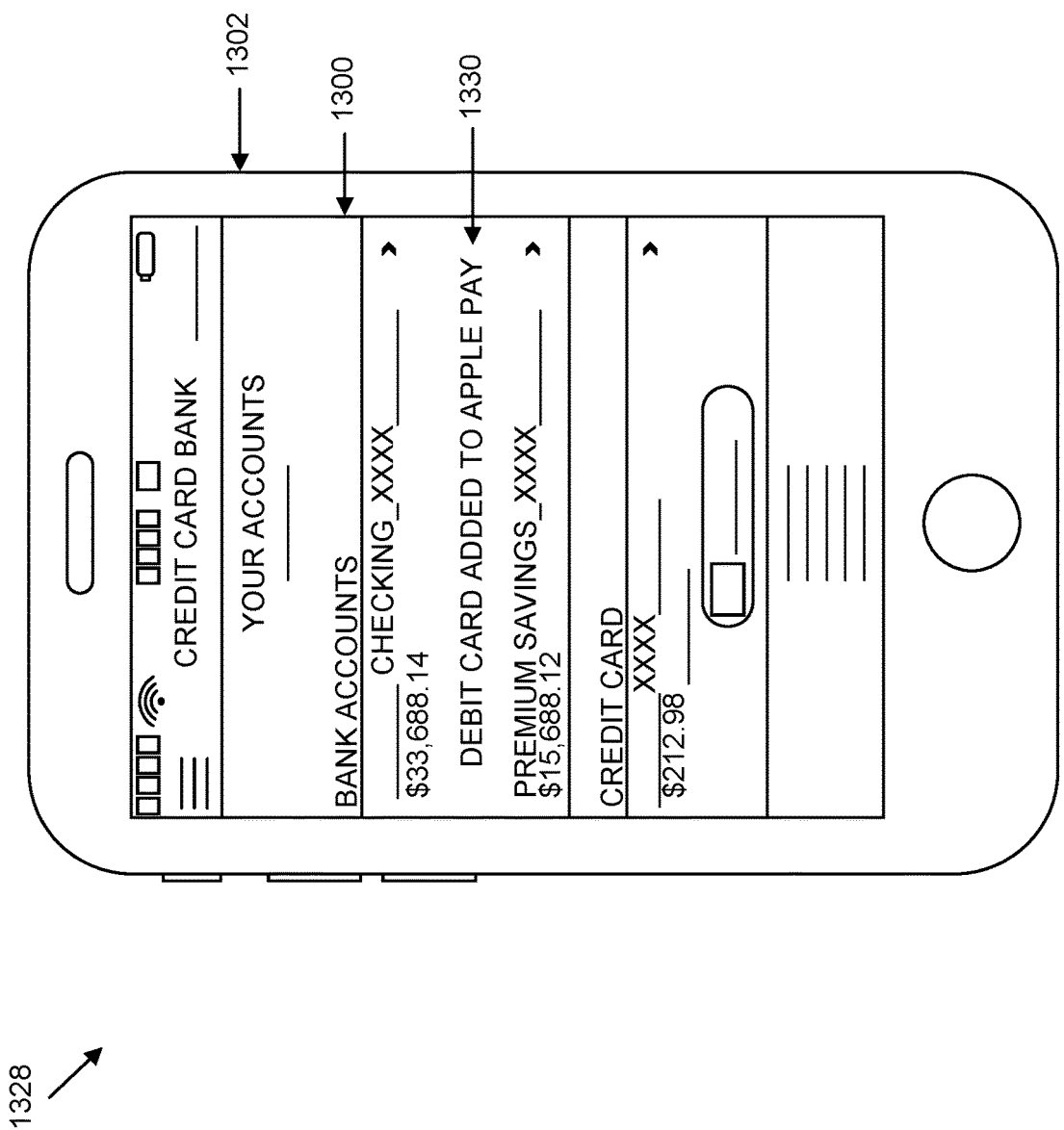

Upon clicking on the agree button 1320, the cardholder may be directed to a user interface 1322 of FIG. 13D where the cardholder may get a message 1324 indicating whether the push provisioning process is successful. The message 1324 may correspond to the operation 1096. When the cardholder clicks on the agree button 1320, the operations 1070-1094 may be performed in the background. Upon clicking on a done button 1326, the cardholder may be directed to a user interface 1328 of FIG. 13E. The user interface 1328 takes the cardholder back to the issuer web application 1300 and shows a message 1330 indicating that the selected payment source has been push provisioned to the pay wallet.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of exemplary configurations including implementations. However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the technology. Also, a number of steps may be undertaken before, during, or after the above elements are considered. Accordingly, the above description does not bind the scope of the claims.

As used herein and in the appended claims, the singular forms "a", "an", and "the" include plural references unless the context clearly dictates otherwise. Thus, for example, reference to "a user" includes a plurality of such users, and reference to "the processor" includes reference to one or more processors and equivalents thereof known to those skilled in the art, and so forth.

Also, the words "comprise", "comprising", "contains", "containing", "include", "including", and "includes", when used in this specification and in the following claims, are intended to specify the presence of stated features, integers, components, or steps, but they do not preclude the presence or addition of one or more other features, integers, components, steps, acts, or groups.

What is claimed is:

1. A non-transitory computer-readable medium comprising computer-readable instructions stored thereon that when executed by at least one first processor associated with a gateway and at least one second processor associated with a software development kit for provisioning a payment source cause the at least one first processor and the at least one second processor to:
   receive, by the gateway, a first request from an issuer application on behalf of a cardholder for a list of entities comprising merchants or pay wallets that are eligible to receive the payment source;
   send, by the gateway, the list of entities to the issuer application for display to the cardholder for selection of an entity from the list of entities;
   receive, by the software development kit and from the issuer application, the selected entity;
   prepare, by the software development kit, pass-through data for sending to the issuer application to request provisioning of the payment source to the selected entity;
   receive, by the gateway, a second request from the issuer application in response to sending the list of entities to the issuer application, wherein the second request comprises the pass-through data, an asset identifier associated with the selected entity, and user data associated with the cardholder;

prepare and transmit, by the gateway, a response to the issuer application upon receiving the second request, wherein depending upon a type of a token service provider or the selected entity, the response comprises (a) an encrypted payload obtained by encrypting, by the gateway, at least the entity identifier and the user data; or (b) a receipt identifier;

receive, by the software development kit, the response from the issuer application;

redirect, by the software development kit, from the issuer application to an entity application associated with the selected entity, wherein the redirection includes sending the encrypted payload or the receipt identifier to the entity application to allow the entity application to send the encrypted payload or the receipt identifier to the token service provider to request a new token for the payment source from the token service provider;

receive, by the software development kit, a result from the entity application indicating whether the entity application successfully received the new token from the token service provider; and determine, by the software development kit and based on the result, whether the request for the provisioning of the payment source is successful.

2. The non-transitory computer-readable medium of claim 1, further comprising computer-readable instructions that when executed by the at least one first processor causes the at least one first processor to:

request, by the gateway, the list of entities from the token service provider in response to receiving the first request, wherein to request the list of entities, the gateway determines the type of the token service provider and transmits a message suitable for the type of the token service provider, wherein the message comprises:

a first call, by the gateway, to the token service provider to obtain a first list of entities from the token service provider, wherein the first list of entities comprises all entities that are eligible for receiving the payment source; and a second call, by the gateway, to the token service provider to obtain a second list of entities from the token service provider, wherein the second call is in response to receiving the first list of entities, wherein the second list of entities comprises a subset of the all entities that have an existing token for the payment source from the token service provider, and wherein the list of entities that is sent, by the gateway, to the issuer application for display to the cardholder is based on the first list of entities and the second list of entities.

3. The non-transitory computer-readable medium of claim 2, wherein the list of entities that is sent, by the gateway, to the issuer application for display to the cardholder comprises a logo of at least a subset of entities in the list of entities.

4. The non-transitory computer-readable medium of claim 2, wherein the request, by the gateway, for the list of entities from the token service provider in response to receiving the first request further comprises a third call, by the gateway, to the token service provider to request a logo of each new entity identified from the first list of entities, and wherein the logo of at least a subset of the new entities is included in the list of entities that is sent, by the gateway, to the issuer application for display to the cardholder.

5. The non-transitory computer-readable medium of claim 4, wherein each of the first call, the second call, and the third call is an Application Programming Interface ("API") call.

6. The non-transitory computer-readable medium of claim 1, wherein the provisioning of the payment source to the selected entity occurs through a mobile application or a web application associated with the issuer application and the entity application.

7. The non-transitory computer-readable medium of claim 1, wherein the software development kit is integrated into the issuer application.

8. A system comprising:
at least one memory comprising computer-readable instructions stored thereon; and
at least one first processor associated with a gateway and at least one second processor associated with a software development kit to provision a payment source, wherein the at least one first processor and the at least one second processor executes the computer-readable instructions to:

receive, by the gateway, a first request from an issuer application on behalf of a cardholder for a list of entities comprising merchants or pay wallets that are eligible to receive the payment source;

send, by the gateway, the list of entities to the issuer application for display to the cardholder for selection of an entity from the list of entities;

receive, by the software development kit and from the issuer application, the selected entity;

prepare, by the software development kit, pass-through data for sending to the issuer application to request provisioning of the payment source to the selected entity;

receive, by the gateway, a second request from the issuer application in response to sending the list of entities to the issuer application, wherein the second request comprises the pass-through data, an asset identifier associated with the selected entity, and user data associated with the cardholder;

prepare and transmit, by the gateway, a response to the issuer application upon receiving the second request, wherein depending upon a type of a token service provider or the selected entity, the response comprises (a) an encrypted payload obtained by encrypting, by the gateway, at least the entity identifier and the user data; or (b) a receipt identifier;

receive, by the software development kit, the response from the issuer application;

redirect, by the software development kit, from the issuer application to an entity application associated with the selected entity, wherein the redirection includes sending the encrypted payload or the receipt identifier to the entity application to allow the entity application to send the encrypted payload or the receipt identifier to the token service provider to request a new token for the payment source from the token service provider;

receive, by the software development kit, a result from the entity application indicating whether the entity application successfully received the new token from the token service provider; and determine, by the software development kit and based on the result, whether the request for the provisioning of the payment source is successful.

9. The system of claim 8, wherein the at least one memory further comprises computer-readable instructions that when executed by the at least one first processor cause the at least one first processor to:

request, by the gateway, the list of entities from the token service provider in response to receiving the first request, wherein to request the list of entities, the gateway determines the type of the token service provider and transmits a message suitable for the type of the token service provider, wherein the message comprises:
- a first call, by the gateway, to the token service provider to obtain a first list of entities from the token service provider, wherein the first list of entities comprises all entities that are eligible for receiving the payment source; and
- a second call, by the gateway, to the token service provider to obtain a second list of entities from the token service provider, wherein the second call is in response to receiving the first list of entities, wherein the second list of entities comprises a subset of the all entities that have an existing token for the payment source from the token service provider, and wherein the list of entities that is sent, by the gateway, to the issuer application for display to the cardholder is based on the first list of entities and the second list of entities.

10. The system of claim 9, wherein the list of entities that is sent, by the gateway, to the issuer application for display to the cardholder comprises a logo of at least a subset of entities in the list of entities.

11. The system of claim 9, wherein the request, by the gateway, for the list of entities from the token service provider in response to receiving the first request further comprises a third call, by the gateway, to the token service provider to request a logo of each new entity identified from the first list of entities, and wherein the logo of at least a subset of the new entities is included in the list of entities that is sent, by the gateway, to the issuer application for display to the cardholder.

12. The system of claim 11, wherein each of the first call, the second call, and the third call is an Application Programming Interface ("API") call.

13. The system of claim 8, wherein the provisioning of the payment source to the selected entity occurs through a mobile application or a web application associated with the issuer application and the entity application.

14. The system of claim 8, wherein the software development kit is integrated into the issuer application.

15. A method comprising:
- receiving, by at least one first processor associated with a gateway and at least one second processor associated with a software development kit for provisioning a payment source and executing computer-readable instructions stored on at least one memory, a first request from an issuer application on behalf of a cardholder for a list of entities comprising merchants or pay wallets that are eligible for receiving the payment source;
- sending, by the gateway, the list of entities to the issuer application for display to the cardholder for selection of an entity from the list of entities;
- receiving, by the software development kit and from the issuer application, the selected entity;
- preparing, by the software development kit, pass-through data for sending to the issuer application to request provisioning of the payment source to the selected entity;
- receiving, by the gateway, a second request from the issuer application in response to sending the list of entities to the issuer application, wherein the second request comprises the pass-through data, an asset identifier associated with the selected entity, and user data associated with the cardholder;
- preparing and transmitting, by the gateway, a response to the issuer application upon receiving the second request, wherein depending upon a type of a token service provider or the selected entity, the response comprises (a) an encrypted payload obtained by encrypting, by the gateway, at least the entity identifier and the user data; or (b) a receipt identifier;
- receiving, by the software development kit, the response from the issuer application;
- redirecting, by the software development kit, from the issuer application to an entity application associated with the selected entity, wherein the redirection includes sending the encrypted payload or the receipt identifier to the entity application to allow the entity application to send the encrypted payload or the receipt identifier to the token service provider to request a new token for the payment source from the token service provider;
- receiving, by the software development kit, a result from the entity application indicating whether the entity application successfully received the new token from the token service provider; and
- determining, by the software development kit and based on the result, whether the request for the provisioning of the payment source is successful.

16. The method of claim 15, further comprising computer-readable instructions that when executed by the at least one first processor causes the at least one first processor to:
- request, by the gateway, the list of entities from the token service provider in response to receiving the first request, wherein to request the list of entities, the gateway determines the type of the token service provider and transmits a message suitable for the type of the token service provider, wherein the message comprises:
- a first call, by the gateway, to the token service provider to obtain a first list of entities from the token service provider, wherein the first list of entities comprises all entities that are eligible for receiving the payment source; and
- a second call, by the gateway, to the token service provider to obtain a second list of entities from the token service provider, wherein the second call is in response to receiving the first list of entities, wherein the second list of entities comprises a subset of the all entities that have an existing token for the payment source from the token service provider, and wherein the list of entities that is sent, by the gateway, to the issuer application for display to the cardholder is based on the first list of entities and the second list of entities.

17. The method of claim 16, wherein the list of entities that is sent, by the gateway, to the issuer application for display to the cardholder comprises a logo of at least a subset of entities in the list of entities.

* * * * *